(12) United States Patent
Roy et al.

(10) Patent No.: US 8,413,052 B2
(45) Date of Patent: *Apr. 2, 2013

(54) BIDDED MARKETPLACE FOR APPLICATIONS

(75) Inventors: Scott Roy, Palo Alto, CA (US); Burke Culligan, Menlo Park, CA (US); David Chaiken, Menlo Park, CA (US); Darshan Kantak, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 12/707,622

(22) Filed: Feb. 17, 2010

(65) Prior Publication Data
US 2011/0202821 A1 Aug. 18, 2011

(51) Int. Cl.
*G06F 17/00* (2006.01)
(52) U.S. Cl. .......... 715/273; 715/205
(58) Field of Classification Search .......... 715/205, 715/273
See application file for complete search history.

(56) References Cited

U.S. PATENT DOCUMENTS

| | | | |
|---|---|---|---|
| 6,173,297 B1* | 1/2001 | Moon et al. | 715/205 |
| 8,121,960 B2* | 2/2012 | Haenel et al. | 706/12 |
| 2008/0071929 A1 | 3/2008 | Motte et al. | |
| 2008/0154847 A1* | 6/2008 | Chellapilla et al. | 707/3 |
| 2008/0201643 A1 | 8/2008 | Nagaitis et al. | |
| 2008/0275770 A1* | 11/2008 | Kitts | 705/14 |
| 2009/0030785 A1* | 1/2009 | Goyal et al. | 705/14 |
| 2009/0158190 A1 | 6/2009 | Higginson | |
| 2010/0169264 A1* | 7/2010 | O'Sullivan et al. | 706/52 |
| 2010/0235243 A1* | 9/2010 | Hecht | 705/14.71 |
| 2010/0241507 A1* | 9/2010 | Quinn et al. | 705/14.42 |
| 2011/0166942 A1* | 7/2011 | Vassilvitskii et al. | 705/14.71 |
| 2011/0184771 A1* | 7/2011 | Wells | 705/7.14 |
| 2011/0184941 A1* | 7/2011 | El-Charif et al. | 707/723 |
| 2012/0185473 A1* | 7/2012 | Ponting et al. | 707/728 |
| 2012/0291022 A1* | 11/2012 | Mehta et al. | 717/176 |

FOREIGN PATENT DOCUMENTS

KR 1020080087876 10/2008

OTHER PUBLICATIONS

Pennock et al., Extracting Collective Probabilistic Forecast from Web Games, ACM 2001, pp. 174-183.*

(Continued)

*Primary Examiner* — Cong-Lac Huynh
(74) *Attorney, Agent, or Firm* — Martine Penilla Group, LLP

(57) ABSTRACT

Methods and systems for presenting application modules on a graphical display page are provided. In accordance with one embodiment, content to be displayed on a graphical display page is determined. Then, content features which describe the content that is to be displayed on the graphical display page, and user features which describe characteristics of users are determined. For each application in the plurality of application modules, the probability that specific users will select the application module when displayed on the graphical display page with the determined content is determined based on the content features and the user features. For each application module in the plurality of application modules, an overall score is determined based on the determined probability that the user will select the application module and a commercial value to be paid by a publisher of the application module when it is selected. The recommended application modules are determined to be those application modules in the plurality of application modules which have the highest overall score and which satisfy a set of constraints. Representations of the recommended application modules are displayed on the graphical display page.

23 Claims, 14 Drawing Sheets

OTHER PUBLICATIONS

Haruechaiyasak et al., Article Recommendation Based on a Topic Model for Wikipedia Selection for Schools, Google 2008, pp. 339-342.*

Graepel et al., Web-Scale Bayesian Click-Through Rate Prediction for Sponsored Search Advertising in Microsoft's Bing Search Engine, Google 2009, pp. 1-8.*

PCT/US2011/024720 International Search Report, dated Oct. 31, 2011 (3 pgs).

PCT/US2011/024720 Notification Concerning Transmittal of International Preliminary Report on Patentability (IPRP) dated Aug. 30, 2012 (1 pg) with attached IPRP (1 pg) and Written Opinion of the International Searching Authority (4 pgs).

* cited by examiner

BIDDED MARKETPLACE FOR APPLICATIONS

BACKGROUND

1. Field of the Invention

The present invention relates to methods and systems for generating a bidded marketplace for applications.

2. Description of the Related Art

A web portal presents information from several different sources to a user. Web portals may include several pieces of content such as news, finance, sports, and entertainment. Portals may also provide access to numerous services such as an internet search tool, e-mail, maps, etc. Examples of public web portals include the MSN and Yahoo! homepages. Portals generally provide a consistent look and feel so as to enable access control and procedures for multiple applications and databases in a user-friendly manner.

Web portals may also include customization features which allow an individual user to tailor their experience according to their personal preferences. Application modules (or applets) may be installed by a user to facilitate personalization of the user's web portal. These application modules may provide various types of functionality so as to enrich the experience of the user. For example, an application module may be specialized so as to provide updates regarding a particular area of interest to the user, such as a specific type of news. Moreover, these application modules may be utilized by content providers as a way to provide services to users within the context of the user's web portal.

It is in this context that embodiments of the invention arise.

SUMMARY

Broadly speaking, embodiments of the present invention provide methods and systems for presenting application modules to a user. In various embodiments of the invention, an optimal selection of application modules is determined based on several factors. These factors include features of the content to be displayed on the graphical display page alongside the application modules, characteristics of the user, and characteristics of the application modules themselves. Several inventive embodiments of the present invention are described below.

In one embodiment, a method for presenting application modules from a plurality of application modules on a graphical display page is provided. According to the method, content to be displayed on a graphical display page is determined. Then content features are determined, the content features including data which describes the content that is to be displayed on the graphical display page. Also, user features are determined, the user features including data which describes characteristics of users. For each application in the plurality of application modules, the probability that specific users will select the application module when displayed on the graphical display page with the determined content is determined based on the content features and the user features. For each application module in the plurality of application modules, an overall score is determined based on the determined probability that the user will select the application module and a commercial value to be paid by a publisher of the application module when it is selected. Recommended application modules are determined to be those application modules in the plurality of application modules which have the highest overall score and which satisfy a set of constraints. Representations of the recommended application modules are displayed on the graphical display page.

In one embodiment, the user features may include features such as age, gender, location, and topics and sources of interest to the user.

In one embodiment, the selection of an application module may consist of various actions, such as clicking on the representation of the application module, subscribing to the application module, purchasing the application module, or adding the application module to a group of personal application module.

In one embodiment, the determination of the overall score may include multiplying the determined probability that the user will select the application module by the price to be paid by the publisher of the application module when it is selected. The publisher may assign a different price to different user segments or selection actions.

In one embodiment, the set of constraints may include a variety constraint, the variety constraint requiring that the recommended application modules include more than one type of applet.

In one embodiment, the content may consist of various types such as news, articles, pictures, and advertisements.

In one embodiment, each of the displayed representations of the recommended application modules includes a link to additional information related to the displayed representation's corresponding application module. In various embodiments, the additional information may include information such as a description of the corresponding application module, access to a mechanism for facilitating purchase of the corresponding application module, and access to a mechanism for facilitating addition of the corresponding application module to a group of personal application modules.

According to another embodiment of the invention, a method for presenting application modules from a plurality of application modules on a graphical display page is provided. According to the method, a plurality of application modules is obtained from publishers, the publishers defining content for the application modules. The publishers assign a commercial value to each of the application modules, and the commercial value represents a cost to the publisher when the application module is presented. A user profile is identified for a selected user that interfaces with a graphical display page that is to present one or more of the obtained application modules. A probability value is obtained for the selected user for each one of the plurality of application modules, the probability value defining which ones of the plurality of application modules is most likely to be used by the selected user. The probability value is combined with the commercial value assigned by the publisher. And a set of application modules is presented on the graphical display page in a priority orientation, such that the priority orientation defines an optimal placement based on the commercial value and the probability value.

In one embodiment, the user profile for the selected user includes data which describes characteristics of the selected user.

In one embodiment, the characteristics of the selected user may include various characteristics such as age, gender, and location.

In one embodiment, the characteristics of the selected user may include content preferences of the selected user when interacting with the graphical display page.

In one embodiment, the content preferences of the selected user are determined by tracking the interactions of the selected user with the graphical display page. In another embodiment, the content preferences of the selected user are determined by looking at his interactions with other pages, for example all of his Web activity.

In one embodiment, the probability value for each one of the plurality of application modules is determined based on the user profile and characteristics of each one of the plurality of application modules.

In another embodiment of the invention, a method for displaying application icons is provided. The method includes an operation of generating an application icon. Then, the application icon is associated to an application module obtained from a publisher, the publisher providing a monetization value for the application module. The application module is categorized according to characteristics of the application module. Then, scenarios are modeled to identify a probability for specific users, the scenarios including presentation of the application icon on a graphical display page. The probability indicates a likelihood that a specific user will select the application module associated with the application icon. And the application icon is displayed on the graphical display page in a priority orientation based on the probability and monetization value for the application module.

In one embodiment, the probability is determined based on characteristics of the specific user, characteristics of content displayed on the graphical display page, and the characteristics of the application module.

In one embodiment, the characteristics of the specific user may include characteristics such as of age, gender, and location.

In one embodiment, the monetization value is defined by a cost to be paid by the publisher when the specific user selects the application module.

In one embodiment, the selection of the application module may consist of actions such as clicking on the application icon, purchasing the application module, or adding the application module to a group of personal application modules.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for displaying recommended applications on a graphical display page. Application modules may be ranked by expected return, based on a probability that a user will take an action related to the application and an amount that a publisher of the application is willing to pay for the action.

It will be obvious, however, to one skilled in the art, that the present invention may be practiced without some or all of these specific details. In other instances, well known process operations have not been described in detail in order not to unnecessarily obscure the present invention.

Figure 1:
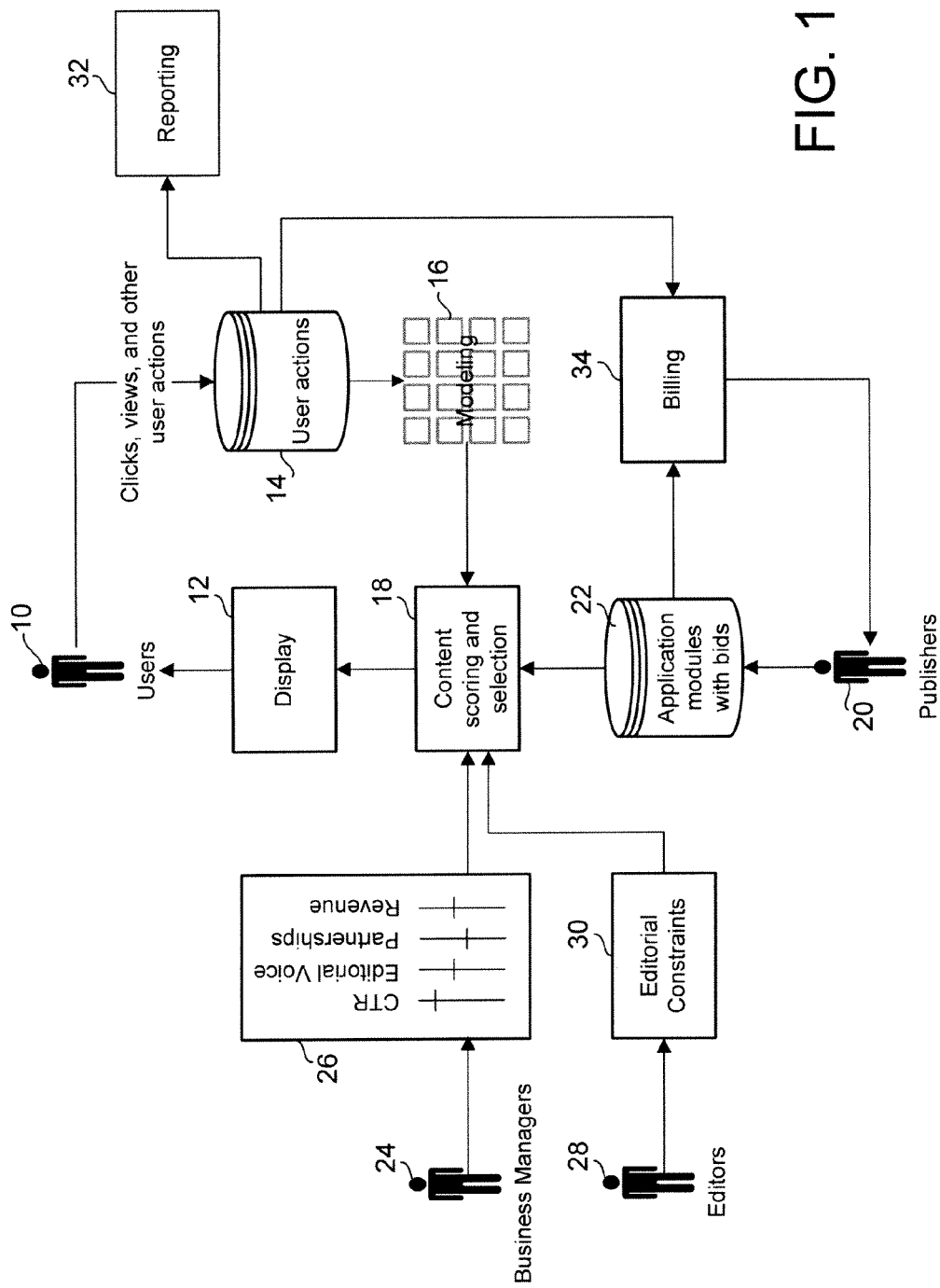
FIG. 1 illustrates a system for displaying application modules on a graphical display page to a user, in accordance with an embodiment of the invention.

With reference to FIG. 1, a system for displaying application modules on a graphical display page to a user 10 is shown. The user 10 interacts with a graphical display page which is rendered by display system 12. The display system 12 includes components which are utilized for generating and rendering the graphical display page to the user, and may include different components depending on the context in which the graphical display page is to be rendered.

For example, in one embodiment, the display system 12 may include a server computer for generating the graphical display page, a network for communicating the graphical display page, a personal computing device for receiving the graphical display page, and a display which is connected to or otherwise integrated with the personal computing device for reproducing the graphical display page in visual format. Examples of displays include monitors, televisions, projectors, etc. In various embodiments, the computing device may be any device capable of receiving the graphical display page, such as a computer terminal, a desktop computer, a laptop computer, a personal digital assistant (PDA), smartphone, cellular phone, netbook, etc. The network may be wired (e.g. digital subscriber line, cable, fiber optic, etc.), wireless (e.g. satellite, cellular, etc.), or incorporate both wired and wireless technologies for data transmission. The network may be a local area network (LAN), wide area network (WAN), the Internet, or any other type of network useful for transmitting data.

In one embodiment, the graphical display page is a web page. Thus, the display system 12 may include a web server for generating the web page. The web server may be connected to the Internet for transmission of the web page. The user 10 uses a personal computing device to receive and display the web page.

In other embodiments, the graphical display page may be any type of display page upon which application modules may be displayed or recommended to a user. For example, the graphical display page may be rendered by an application running on the user's personal computing device. The application may connect to a remote server via a network. The remote server may provide data to enable the application to render the graphical display page.

The graphical display page may be utilized to display various kinds of content, such as text, pictures, video, etc. In some embodiments, the graphical display page may be a web portal. The web portal may include various types of content or provide links to different kinds of content, such as news, sports, finance, entertainment, personals, shopping, travel, job search, maps, movies, autos, etc. While a web portal is one example of a web page which is a type of graphical display page, other types of web pages and graphical display pages may be utilized which may contain various kinds of content.

Throughout this disclosure, reference will generally be made to embodiments directed to the display of a web page as an embodiment of a graphical display page. However, it should be understood that the principles described herein may be applied to other contexts and other types of graphical display pages without departing from the scope of the present invention. For example, the graphical display page may be generated by a standalone or locally hosted program or application.

Application modules (or applets or applications) will be understood by those skilled in the art as discreet programs which are a distinguishable part of the graphical display page. In some embodiments, the application modules may be integrated as part of the graphical display page, so as to provide additional utility to the user viewing the graphical display page. The additional utility provided by the application module may take various forms. For example, the application module may provide additional content for display on the graphical display page. Or the application module may modify the appearance or functionality of the graphical display page. In other embodiments, the application modules may function separately from the graphical display page. The application modules may be executed independently of the graphical display page, or in a manner dependent on the graphical display page. In one example, execution of the application module from the graphical display page may cause generation of a second graphical display page which is utilized to host the application module's functionality.

In one embodiment, the graphical display page is a web portal. As discussed above, a web portal may provide a variety of different kinds of information and content in a unified location. However, the user may wish to additionally customize the web portal to their liking, so as to provide a richer experience tailored to their preferences. The web portal may be configured to facilitate this by enabling a user to save personal settings which are specific to the user and which affect or determine various aspects of the web portal that is presented to the user. For example, a user who is interested in a particular subject area might add an application module which relates to that subject area as a part of their personal settings for the web portal. Then when the user views the web portal, the application module may provide content which relates to the subject area in an integrated manner as part of the web portal which is presented to the user.

It should be appreciated that an application module may provide any of various types of content. Examples of types of content which may be provided by an application module include, but are not limited to, the following: text, pictures, photos, graphics, audio, video, articles, stories, games, shopping, advertisements, news, weather, sports, entertainment, business/finance, calendar, personal planner, email, real estate, music, maps, personals, travel, groups, instant messaging, tracking, monitoring, utilities, editors, etc. These are merely examples of types of content which may be provided by an application module, as in various embodiments of the invention, the application module may provide any type of content which may be presented by an application module as herein defined.

With continued reference to FIG. 1, the user 10 may interact with a graphical display page in various ways. For example, the user 10 may perform actions such as clicking on a link, navigating to a particular page, hovering over particular content, playing multimedia content, entering text (e.g. entering search query terms), adding an application to a group of personalization applications, etc. Additionally, data relating to interactions may be of significance, such as the amount of time spent on a particular page of a web portal. It should be appreciated that examples of interactions with a graphical display page discussed herein are provided merely by way of example, and not by way of limitation. In alternative embodiments of the invention, any type of interaction with a graphical display page may be recorded. To facilitate interactions with a graphical display page, any of various types of interfaces may be utilized without departing from the scope of the invention. Examples of interfaces which facilitate interaction with a graphical display page include, but are not limited to, a keyboard, mouse, trackball, touchpad, joystick, speech or audio recognition interface, stylus, touch-sensitive display, motion detection interfaces and other types of interfaces.

The user interactions with the graphical display page are captured and recorded in a user actions database 14. In exemplary embodiments of the invention, the user interactions are captured by server logs which record the activity of a user interacting with a graphical display page. As explained in further detail below, the raw captured data may be converted to logical events which are indicative of the significance of each of the user's captured interactions. These logical events are then communicated to a modeling module 16.

The modeling module 16 receives the logical events and determines the probability that the user will take a particular action when presented with certain content on the graphical display page. For example, in one embodiment, the modeling module 16 may determine the probability that a specific user will click on an icon representative of a certain application module. In one embodiment, clicking on the icon may direct a user to a page with more information about the application module and/or where the user may download or add the application module to their settings. In another embodiment, hovering over an icon may cause a pop-up window to appear with information about the application module. Thus, the modeling module 16 may determine the likelihood that a user will hover over the icon. Or in another embodiment, the modeling module 16 may determine the probability that the user will add the application module to their personal applications which are saved as part of their personal settings.

To determine the probability that a user will take a particular action, the modeling module 16 applies any of various models to input data. The input data includes the aforementioned logical events, but also may include various data relating to the user's experience of the graphical display page. Such input data may include user features which include data that describes characteristics of the user. Examples of characteristics of the user may include, but are not limited to, age, gender, address, location, ethnicity, vocation, income, etc. The user features may further include the personal settings of the user and the interaction history of the user when accessing the graphical display page, as well as other user information which may correlate with or affect the likelihood that the user will take the particular action for which the modeling module 16 calculates a probability. The input data for the modeling module 16 may also include context features, which includes data which describes the context in which the user will view the graphical display page. For example, the context features may include data regarding the type of device on which the user views the graphical display page (e.g. desktop personal computer, laptop, mobile device such as cell phone or pda, etc.), the size of the display on which the graphical display page is viewed, the type of network being used, the type of interface devices being used, etc. The aforementioned logical events, user features, and context features are merely examples of types of input data which may be received by the modeling module 16 for purposes of determining the probability that the user will take a particular action. In other embodiments, the input data for the modeling module may include any type of data which is useful for determining the probability that the user will take a particular action.

The models of the modeling module 16 are continually refined based on the received input data taken in conjunction with result data (e.g. whether or not the user clicked or hovered on an icon, or added an application module). As described in further detail below, this data is utilized as training data to update the models. Thus, the input data is not only used for purposes of determining the probability of the user taking a particular action, but is also utilized to help ensure that the models which are applied to determine that probability are improved over time as more data becomes available.

With continued reference to FIG. 1, an application storage module 22 stores application modules which are developed by publishers 20. The application modules may include creative components such as icons, graphics, information or other related content which may be informative to a user regarding the content, purpose, and functionality of the application module. The application modules also include application logic which includes the functional portion of the application module which is implemented when a user chooses to run, add, or otherwise interact with the application module.

Also, the application storage module 22 stores bids or commercial values which are received from the publishers 20 and associated with their respective application modules. The bids or commercial values represent a cost to be paid by the publishers when a user performs a certain action. For example, a publisher may submit a bid that is a cost-per-click (CPC) that the publisher is willing to pay to the owner of the graphical display page when the publisher's application creative is clicked on by a user. Other examples of possible bids include cost-per-impression bids (e.g. cost that publisher pays when their application creative is displayed or hovered over), and cost-per-action (CPA) bids (e.g. cost that publisher pays when some action is performed, such as the user adding their application to the user's personal applications). In other embodiments, the bids or commercial values may be distinct from, but nonetheless related to, the actual cost that would be paid by a publisher. For example, a bid may represent a maximum value that a publisher is willing to pay for a specific action, whereas the actual cost paid by the publisher might be a value that is a minimum increment greater than the next highest bid. It will be understood by those skilled in the art that bids or commercial values may be received according to various auction formats, such as first price auctions, second price auctions, Vickrey auctions, etc. The foregoing examples of bids and commercial values are provided by way of example only, and not by way of limitation, as any type of bid or commercial value may be assigned to an application module by a publisher, these being stored in the application storage module 22.

With continued reference to FIG. 1, a scoring and selection (SS) module 18 is provided. The SS module 18 receives information from the modeling module 16 and the application storage module 22 to determine a ranked order of the possible application modules which may be displayed on the graphical display page. In one embodiment, the ranked order is determined based on a combination of factors including a probability that a user will select the application module (or take some other action related to the application module) as determined by the modeling module 16, and a bid or commercial value associated with the application module, as received from the application storage module 22.

In one embodiment, a scoring method is employed by the SS module 18 to determine a score for each of the possible application modules, the score then being utilized to determine the ranked order. In one embodiment, the scoring method is based at least in part on the product of the aforementioned factors—i.e. the probability that the user will select the application module multiplied by the bid or commercial value associated with the application module. This product provides an expected value for presentation of the application module on the graphical display page. Thus, in one embodiment, the score includes an expected value which is utilized to determine the ranked order of the application modules.

It will be appreciated by those skilled in the art that in other embodiments of the invention, the particular scoring method utilized by the SS module, as well as the various factors which are included in such a scoring method, may vary considerably. The examples provided herein of various factors and particular scoring methods should be understood as merely exemplary embodiments, and are not intended to limit the scope of the invention in any way.

For example, with continued reference to FIG. 1, optimization interface 26 provides an interfacing mechanism for enabling business managers 24 to affect the scoring method employed by the SS module 18 so as to optimize the scoring method for a desired factor or balance of factors. For example, the optimization criteria may include revenue. By adjusting the optimization criteria of revenue via the optimization interface 26, the business manager 24 can affect the relative importance of revenue in the scoring method applied by the SS module, which ultimately affects the score results for application modules. Thus, if the business manager 24 chooses to set the optimization criteria of revenue at a very high level, then the scoring method will be optimized so as to place a high importance on revenue. The results of the scoring method will therefore be optimized so that the highest scoring application modules tend to be those which yield the highest revenue. Conversely, if the business manager 24 sets the optimization criteria of revenue to be very low, then the scoring method will place little emphasis on revenue, and the results of the scoring method will tend to not be optimized for revenue. (However, it is theoretically possible for the highest scoring results to nonetheless include application modules which provide high revenue if the scoring method applied to the application modules coincidentally yields such score results. But this would be a secondary result of optimizing for criteria other than revenue.)

In one embodiment, the optimization criteria which may be adjusted via the optimization interface 26 includes click through rate (CTR). When the optimization criteria of CTR is increased, then the scoring method applied by the SS module 18 is adjusted so that the relative importance of CTR in determining the overall score of application modules is increased. Thus, by increasing the degree to which the scoring method optimizes for CTR, the business manager 24 can ensure that the highest scoring results will tend to be those application modules which will provide the highest CTR when presented on the graphical display page. In other words, the highest scoring application modules will tend to be those that users are most likely to click through.

In another embodiment, the optimization criteria may include an editorial voice criteria. The editorial voice is the desired voice and image which the owner of the graphical display page wishes to convey to the user. Thus, when the optimization criteria of editorial voice is increased, the scoring method is adjusted so that editorial voice is given a higher relative importance. The scored results are therefore more likely to yield application modules which are consistent with the desired editorial voice or image as the higher ranking application modules.

In one embodiment, the optimization criteria may include a partnerships criteria. The partnerships criteria is indicative of strategic partnerships which the owner of the graphical display page may wish to promote through the selection of certain application modules. Therefore, increasing the partnerships criteria increases the extent to which strategic partnerships are factored into the scoring of the various application modules under consideration. Conversely, decreasing the partnerships criteria decreases the extent to which strategic partnerships are considered when scoring the application modules.

The business managers may be any persons with authority to determine optimization criteria for the scoring methods utilized by the SS module 18. While various examples of optimization criteria have been described herein, these are provided by way of example only and not by way of limitation, as the optimization criteria may include any criteria according to which the scoring method of SS module 18 may be tailored to suit desired outcomes.

With continued reference to FIG. 1, an editorial interface 30 is provided to enable control and application of editorial constraints that affect which application modules are selected, from the ranked order of application modules as determined by the scoring method, for display by the SS module 18. The editorial interface 30 may be managed by editors 28, who are any persons with the ability to determine and apply editorial constraints to the selection of application modules.

In one embodiment, the editorial constraints may include a variety constraint to enhance the user's experience by ensuring a variety of application modules is presented on the graphical display page. Such a variety constraint may thus prevent the display of too many of the same kind of application module, or prevent the recurring display of the same application module, or otherwise ensure that a variety of application modules are presented to the user. In one embodiment, an editorial constraint may ensure that a particular application module appears within the top ranking results of the scoring method, thereby guaranteeing that the particular application module will be displayed on the graphical display page. Or in another example, the editorial constraints may provide for the insertion of a particular application module into a specific spot within the top ranking results of the scoring method, regardless of the application module's actual score. Such features may act as overrides to the scoring method, allowing an editor 28 to ensure that a particular application module will be selected for display on the graphical display page regardless of its actual scored result. Yet another example of a constraint may provide that a particular application module cannot appear above a certain ranking within the ranked results, thereby ensuring that the particular application module will not be presented above a certain rank on the graphical display page. Or a constraint may provide for the opposite situation, wherein a particular application module must appear above a certain ranking within the ranked results. Still other kinds of editorial constraints may provide for session-related constraints, such as a constraint which ensures that a particular application module is presented at least once during a session. The foregoing examples of editorial constraints are provided by way of example only and not by way of limitation. In other embodiments, the editorial constraints may include any type of rule or constraint that is applied to the optimized results of the scoring method, so as to affect the selection of the application modules for display on the graphical display page in a manner independent of the above-mentioned optimization criteria.

In summary, the SS module 18 applies a scoring method to the application modules so as to determine a ranked order of the application modules as candidates for display on the graphical display page. The scoring method may be affected by various optimization criteria via the optimization interface 26. The SS module 18 then selects the highest scoring application modules which satisfy the editorial constraints as determined via the editorial interface 30. The selected application modules are displayed to the user 10 via the display system 12.

With continued reference to FIG. 1, a reporting module 32 is provided for generating reports based on data from the user actions database 14. The reporting module 32 may include an interface to enable a user of the reporting module 32 to generate custom reports tailored to their specific needs. The reporting module 32 may also be configured to automatically generate systematic reports based on data retrieved by polling the user actions database 14 at regular intervals or times.

With continued reference to FIG. 1, a billing module 34 is provided for generating and delivering billing information to the publisher 20 of an application module. The billing module 34 receives data from the user actions database 14 which indicates the interactions with the publisher's application module. The billing module 34 also receives the bidded commercial values of the interactions from the application storage module 22 (e.g. CPC, CPM, CPA, etc.). Based on these interactions and their corresponding bidded values, the cost to be paid by the publisher 20 is determined by the billing module 34, and reported to the publisher 20 for payment.

Figure 2:
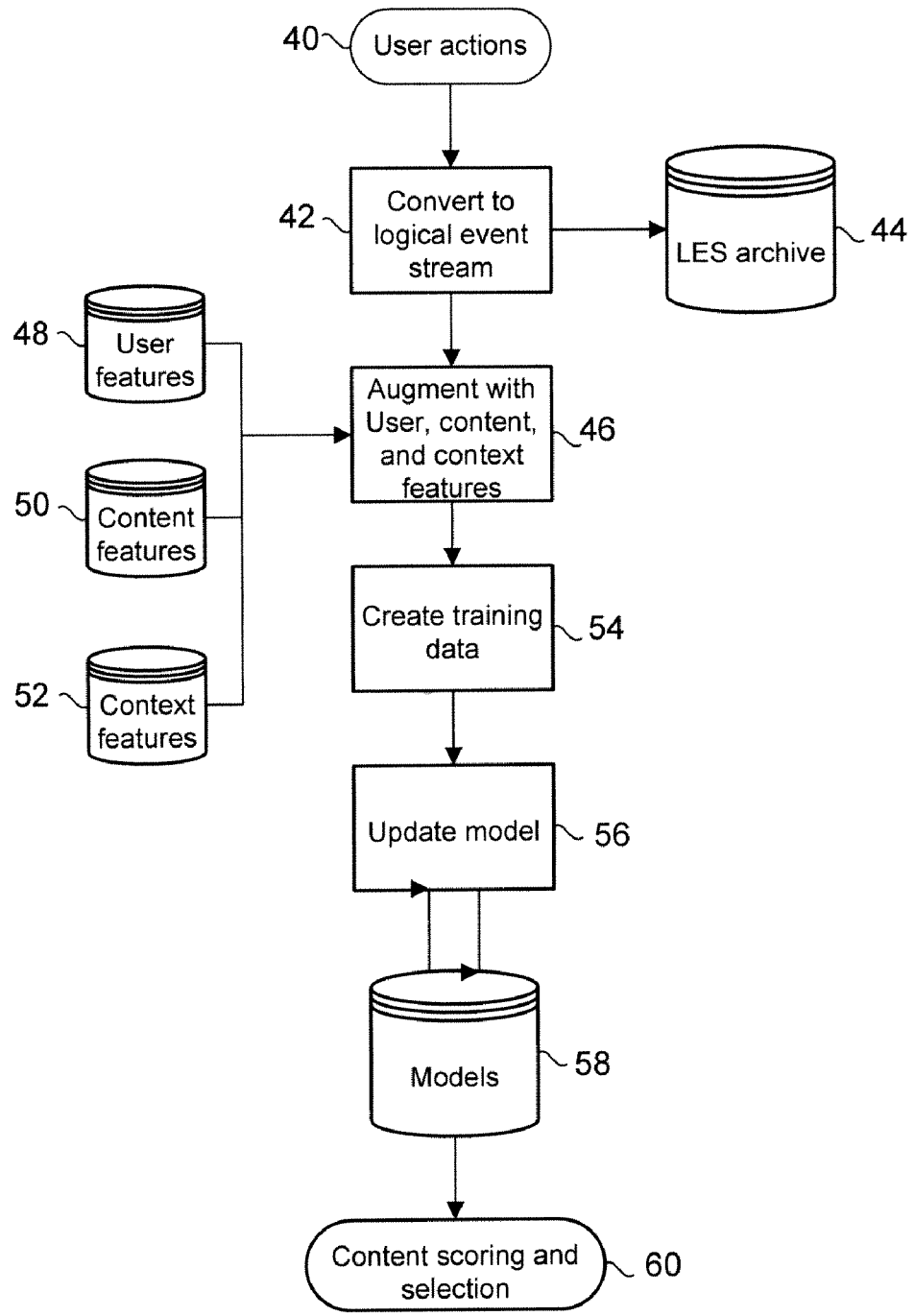
FIG. 2 illustrates a flow diagram for a method for modeling user interactivity with a graphical display page so as to determine the probability that a user will take a particular action, in accordance with an embodiment of the invention.

With reference to FIG. 2, a flow diagram illustrating a method for modeling user interactivity with a graphical display page so as to determine the probability that a user will take a particular action, such as selecting a particular application module when it is displayed on the graphical display page, is shown. At operation 42, raw user actions data 40 are converted to a logical event stream. The raw user actions data 40 constitutes raw data which is recorded during the user's interaction with a graphical display page. The conversion process of the operation 42 thus entails determining the logical significance of the raw user actions data 40 for purposes of modeling a user's interactivity with the graphical display page to determine the probability of the user taking a particular action.

In accordance with one embodiment, the raw user actions data 40 may include data from server logs, page tags, and other sources which generate, record or store data from the user interactions with the graphical display page. By way of example only, such data might indicate that a user clicked on a particular link at a specific time, or hovered over a particular icon, or entered data, etc. However, for purposes of modeling user interactions as herein described, the data would be converted to a logical event by determining the logical significance of the raw user action. Thus, by way of example, a recorded raw data event of a user clicking on a particular link might be converted to a logical event by determining that the user click indicates that the user navigated to a web page for the purpose of viewing a particular type of content. As a second example, a different click may remove an application module that a user is no longer interested in seeing.

In various embodiments, the raw user actions data 40 may include any type of data which may be recorded during, or which are indicative of or result from, user interactions with a graphical display page. Whereas the logical events may be any events interpreted from the raw user actions data 40 which have a logical significance or are otherwise useful for modeling purposes to determine the probability that a user will take a particular action. The logical events may include events relevant to the application modules, such as whether or not a user clicked on, hovered over, selected, or otherwise interacted with an application module which was presented on the graphical display page.

With continued reference to FIG. 2, the logical events generated at operation 42 may be stored in a logical event stream (LES) archive 44. LES archive 44 thus serves as a repository for logical events, and may be accessed as needed for various purposes, including the presently described method for modeling user interactivity. For example, in one embodiment, the LES archive 44 may be configured to store logical events in real-time, and periodically send the accumulated logical events from the most recent time period to the modeling module 16, as described with reference to FIG. 1, so as to update the models. In other embodiments, the LES archive 44 may be configured to store or provide a logical event stream at any time, schedule, or on an as-needed basis.

With continued reference to FIG. 2, at operation 46, the logical event stream is augmented with user features, content features, and context features, which are received from user features storage 48, content features storage 50, and context features storage 52, respectively. The user features, as discussed above, may include data such as age, gender, location, topics and sources of interest to the user, etc. or any other type of data about the user which may be relevant as an attribute for determining the probability that the user will take a particular action. Similarly, the content features, as discussed above, may include data such as the types of content shown on the graphical display page, their size, location, topics, sources, keywords, etc. or any other data describing the content shown on the graphical display page which may be relevant as an attribute for determining the probability that the user will take a particular action. Likewise, the context features, as discussed above, may include data which is descriptive of the context in which the user interacts with the content of the graphical display page, such as the type of device used by the user, the type of page on which the content is being displayed (e.g. a sports page vs. a finance page), etc. or any other contextual data which may be relevant as an attribute for determining the probability that the user will take a particular action. It should be understood that while the foregoing user features, content features, and context features are provided as specific examples of data which are useful for modeling user interactions, any other type of data which may be useful for modeling purposes, as described herein, may be included as well without departing from the scope of the present invention.

With continued reference to FIG. 2, at operation 54, the logical event stream, the user features, the content features, and the context features, are together used to create training data. The training data includes data which can be utilized by a machine learning processor to generate or update models for predictive purposes. Thus, in accordance with an embodiment of the present invention, the training data can include the aforementioned features and logical event stream, which includes data indicating outcomes such as whether or not a user clicked on, hovered over, selected, or otherwise interacted with a particular application module on the graphical display page. At operation 56, the machine learning processor receives this data and generates or updates models which can be utilized to predict the outcomes based on new data. The models are stored in a modeling storage 58. As shown at operation 60, the models in the modeling storage 58 are accessed for content scoring and selection of content for display on the graphical display page.

Figure 3:
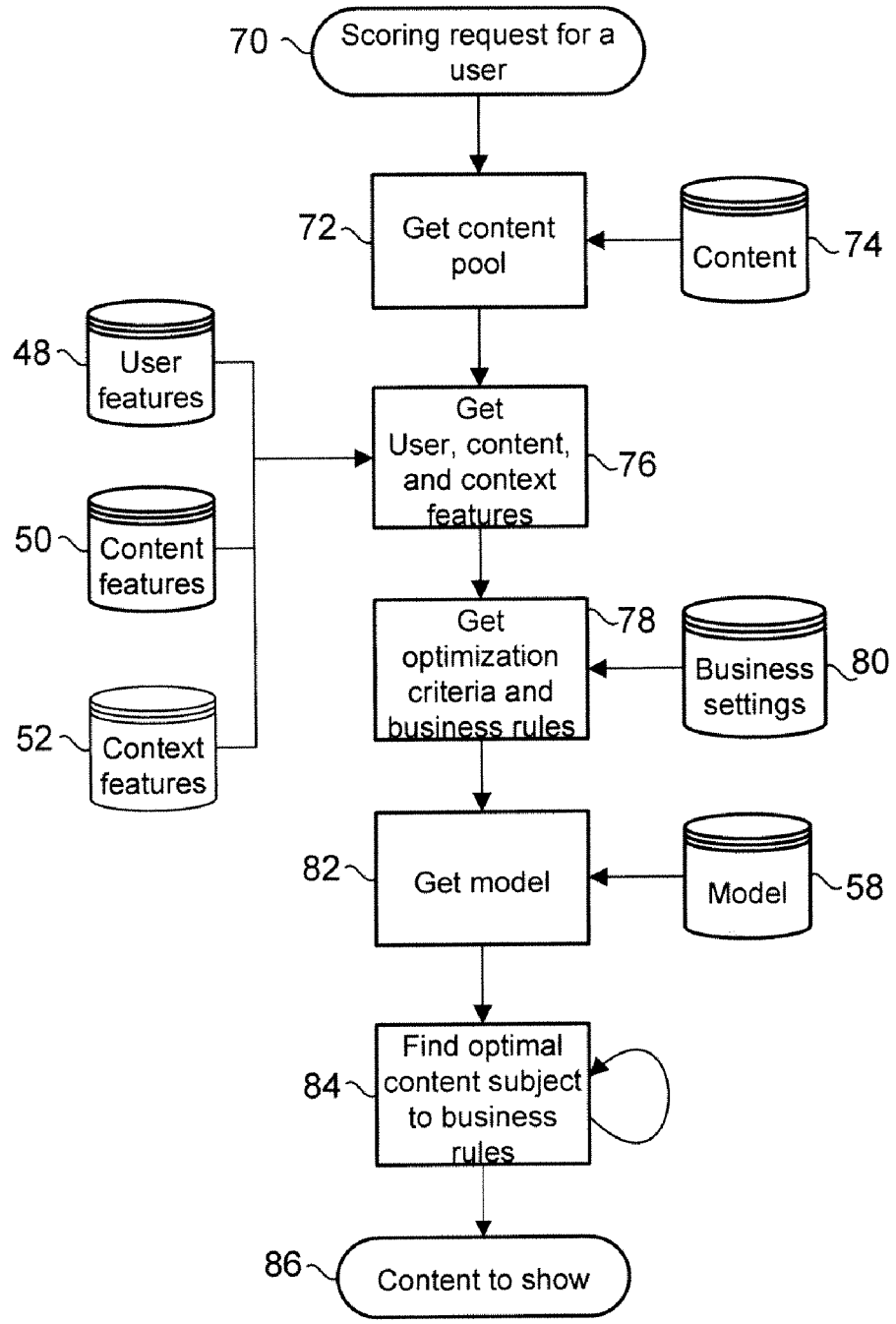
FIG. 3 illustrates a flow diagram for a method for scoring content to be displayed on a graphical display page, in accordance with an embodiment of the invention.

With reference to FIG. 3, a flow diagram illustrating a method for scoring content to be displayed on a graphical display page is shown. At operation 70, a scoring request for a user is received. The scoring request generally results from an action which causes a graphical display page to be rendered to the user. For example, the scoring request may result from the user requesting the graphical display page via their interface (e.g. the user's web browser on a computing device). Or the scoring request for the user may result from some other action which causes the graphical display page to be rendered.

At operation 72, the content pool is retrieved from a content storage 74. The content pool includes those pieces of content which are under consideration for display on the graphical display page, and are therefore to be scored according to the present scoring method. The content storage 74 may include the aforementioned application storage 22, as well as other types of storage for content or metadata relating to content that is to be considered for display on the graphical display page. In accordance with an embodiment of the invention, the content pool includes application modules which are under consideration for display on the graphical display page. The application modules may include all application modules which have been published by the publishers, or selected ones of the application modules based on various criteria. For example, in one embodiment, the application modules which are included as part of the content pool may be filtered or selected based on the publishers' indication of specific target groups. Thus, if the user is determined not to be part of the publisher's indicated target group, then the publisher's application module would be excluded from the content pool. In other embodiments, the application modules may be filtered from or selectively included in the content pool based on any other criteria, whether indicated by the publisher or not.

At operation 76, user features are retrieved from the user features database 48, the user features being data which describes the user, and which are useful for application by a model to predict user interactions with the content. In one embodiment, the user features may be stored as part of a user profile for that specific user. In another embodiment, if the identity of the user is unknown, then a generic set of user features is applied. The generic set of user features may be independently determined, or estimated in part based upon other known pieces of data, such as the content and context features. An example of a generic user feature is location, which in a Web context can be inferred from a user's IP address.

Also at operation 76, content features are retrieved from the content features database 50, the content features being data which describes attributes of the content under consideration for display on the graphical display page, and which may be used by a model for prediction of user interactions with the content. For example in one embodiment, wherein the content includes application modules, the content features may include descriptive information about the application modules, such as the type of application module, its functionality or features, etc. or any other descriptive information which may be utilized by a model for predicting user interactions with the application module.

Also at operation 76, context features are retrieved from the context features database 52, the context features being data which describes the context in which content selected from the content pool will be displayed on the graphical display page. The context features may thus include any data describing the context which is relevant for predicting user interactions with the selected content according to a model. As discussed, such context features may include various features such as attributes of a device being utilized by the user to view the graphical display page, the setting of the graphical display page (e.g. type of page, etc.), placement, size or any other feature of the context in which the selected content will be displayed that may be utilized by a model for predicting user interactions.

At operation 78, optimization criteria and business rules are retrieved from a business settings database 80. The optimization criteria may include any criteria according to which the results from a model for predicting user interactions may be optimized, such as those criteria discussed above with reference to the optimization interface 26, as well as other criteria. The business rules may include any rules or constraints according to which content from the content pool which has been ranked based on the application of the optimization criteria may be selected. In accordance with one embodiment, the content pool may be ranked based on the application of the optimization criteria to the modeled determination of probabilities of user interactions with the content; and the business rules are applied accordingly to determine which content from the content pool is selected. Examples of the business rules include the editorial constraints as discussed above with reference to the editorial interface 30, as well as other business rules and constraints.

At operation 82, an appropriate model (one or more) is selected from the modeling storage 58 for determining the probability of user interactions with content from the content pool based on the user features, the content features, and the context features. The model is utilized to determine the probability of user interactions with each of the content pieces in the content pool. In accordance with an embodiment of the invention, the model determines the probability that a user will select or otherwise interact with a particular application module which is part of the content pool.

At operation 84, the optimal content is found subject to the business rules. In one embodiment, the optimization criteria are applied to the results of the modeling so as to determine an overall score for each piece of content in the content pool. The overall score thus determines a ranked order for the content pieces of the content pool. Based on this ranking, the highest scoring content (or otherwise determined optimal content according to the optimization criteria) which satisfies the business rules are selected for display on the graphical display page. This content constitutes the content to be shown 86, which is ultimately displayed on the graphical display page to the user. It is noted that the results of showing the content 86 are captured as user actions, which in turn are utilized for updating the models, as described above with reference to FIG. 2.

Figure 4:
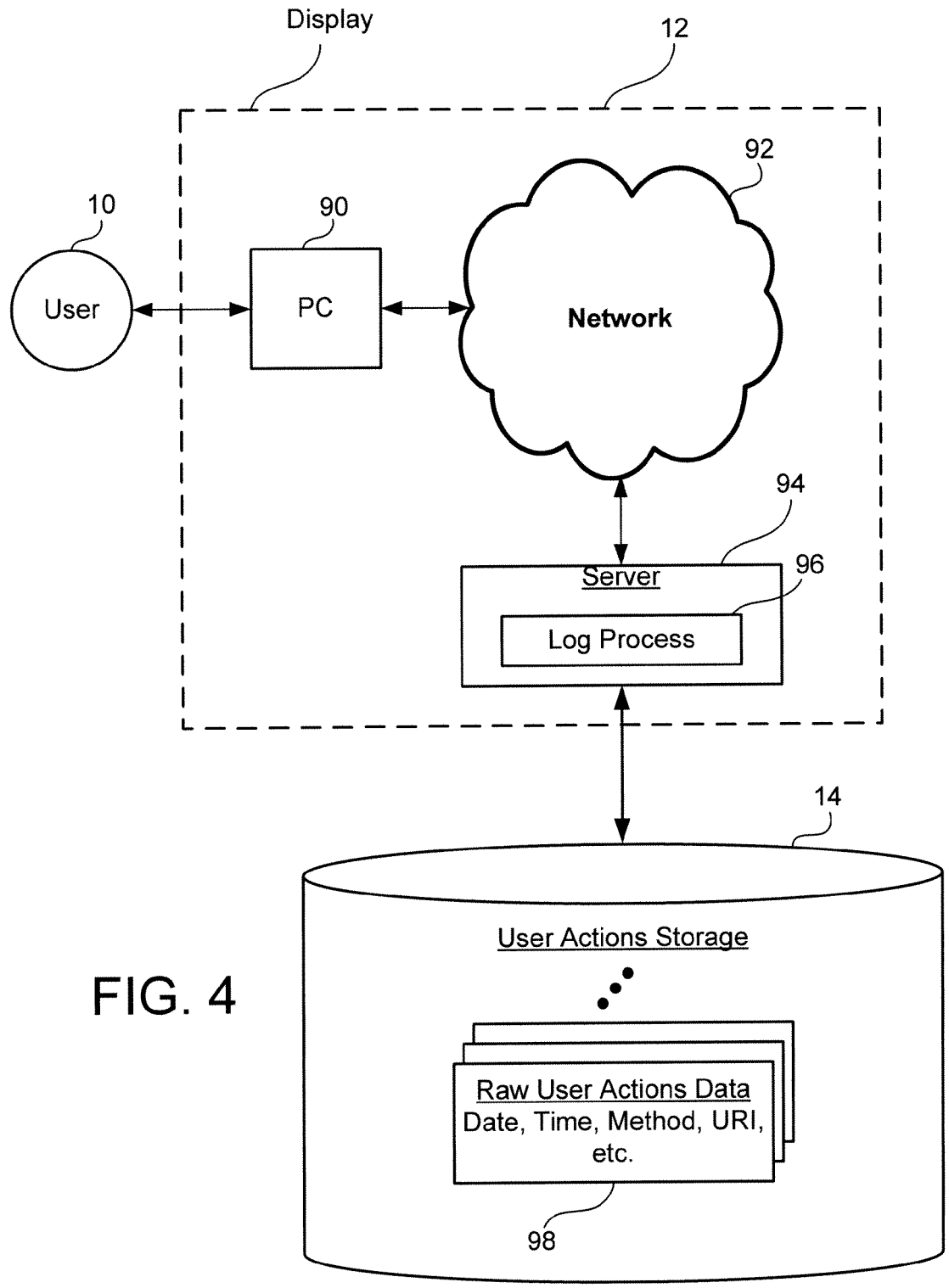
FIG. 4 illustrates a detailed view of components for rendering and recording user interactions with a graphical display page, in accordance with an embodiment of the invention.

With reference to FIG. 4, a detailed view of components for rendering and recording user interactions with a graphical display page is shown. The user 10 interacts with a computing device 90 which includes hardware for receiving and displaying a graphical display page to the user 10. As discussed above, the computing device 90 may be a personal computer, laptop, mobile device, or any other type of device configured to receive data for and render a graphical display page to the user 10. The computing device 90 is connected to a server 94 via a network 92. The network may be any kind of network, such as a LAN, WAN, or the Internet, which is capable of transmitting data for a graphical display page from the server 94 to the computing device 90. In one embodiment, the graphical display page is a web page, and the server 94 is a web server. In other embodiments, the server may be any kind of server device or multiple server devices configured to transmit data for a graphical display page to the computing device 90. The data transmitted may be utilized to define various portions of the graphical display page. In one embodiment, the transmitted data entirely defines the graphical display page, with the computing device 90 merely interpreting the data for purposes of rendering the graphical display page. In other embodiments, the data transmitted defines some fraction of the graphical display page, with the remainder of the graphical display page being defined by other sources of data. For example, the computing device 90 may retrieve data from sources other than server 94, or may execute processes internally for generating portions of the graphical display page. In various embodiments, the proportion of the graphical display page which is defined by the data transmitted from the server 94 may be any fraction.

Additionally, the server 94 includes a log process 96 for logging raw user actions data resulting from user interactions with the graphical display page. The log process 96 may be configured to log all of the data resulting from the user interactions, or may be configured to selectively log only certain kinds of data which are determined to be of significance for purposes of modeling, scoring, or content selection, as described above. The data which is logged by the log process 96 may be generated based on requests received by the server, responses to the requests, page tags, or any other mechanism for generating data which results from user interactions with the graphical display page. In one embodiment, the log process 96 communicates the raw user actions data 98 to a user actions storage 14 as shown for storage purposes. In another embodiment, the log process may generate a server log at the server 94 which initially stores the raw user actions data 98. The user actions storage then retrieves the raw user actions data 98 from the server log for storage in the user actions storage 14.

The raw user actions data 98 may include any type of data which is generated as a result of user interactions with a graphical display page. Examples of types of data recorded as part of the raw user actions data may include information regarding date, time, method of a request, uniform resource identifier (URI), response data, status, etc. or any other type of data pertaining to user interactions with the graphical display page which may be recorded at the server 94.

Figure 5:
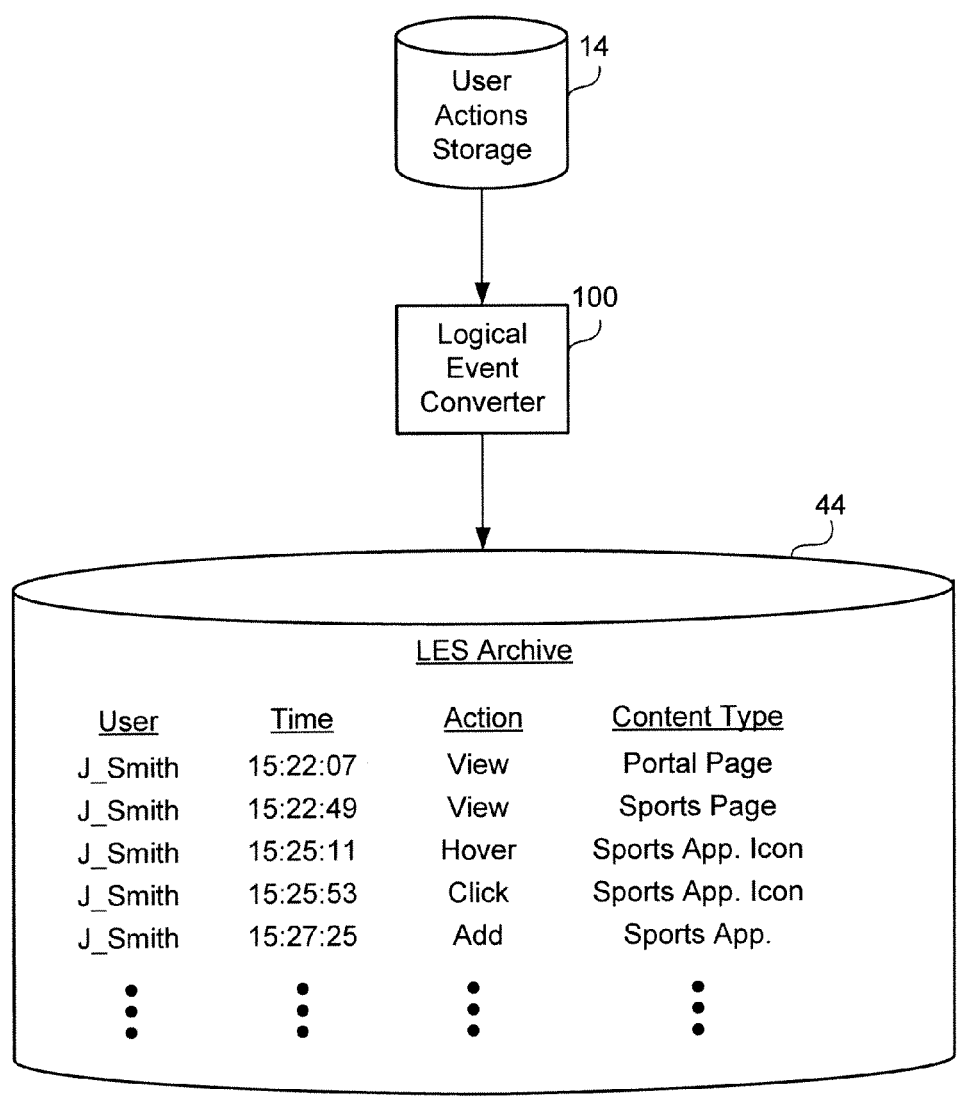
FIG. 5 illustrates components for converting raw user actions data to logical events, in accordance with an embodiment of the invention.

With reference to FIG. 5, components for converting raw user actions data to logical events are shown, in accordance with an embodiment of the invention. The raw user actions data from the user actions storage 14 is converted into a series of logical events by a logical event converter 100. The logical event converter 100 determines the significance of the raw user actions data for purposes of modeling, scoring, and selecting content for display on a graphical display page, as described above.

Various examples of types of actions which may be stored as logical events are illustrated in the LES archive 44 shown at FIG. 5. For example, a user J_Smith is determined to have viewed the portal page at time 15:22:07. At time 15:22:49, J_Smith is determined to have viewed the sports page. At time 15:25:11, it is determined that J_Smith hovered over a sports application icon which was displayed. J_Smith is determined to have clicked on the sports application icon at time 15:25:53. And it is determined that J_Smith added the sports application to his personal applications at time 15:27:25. The foregoing examples of types of actions and parameters determined as logical events are provided by way of example only, and not by way of limitation. The logical events stored in the LES archive 44 may include any type of logical event resulting from user interactions with a graphical display page, and may include, but are not limited to, actions and parameters such as viewing, hovering, clicking, buying, adding, running, duration, etc.

Figure 6:
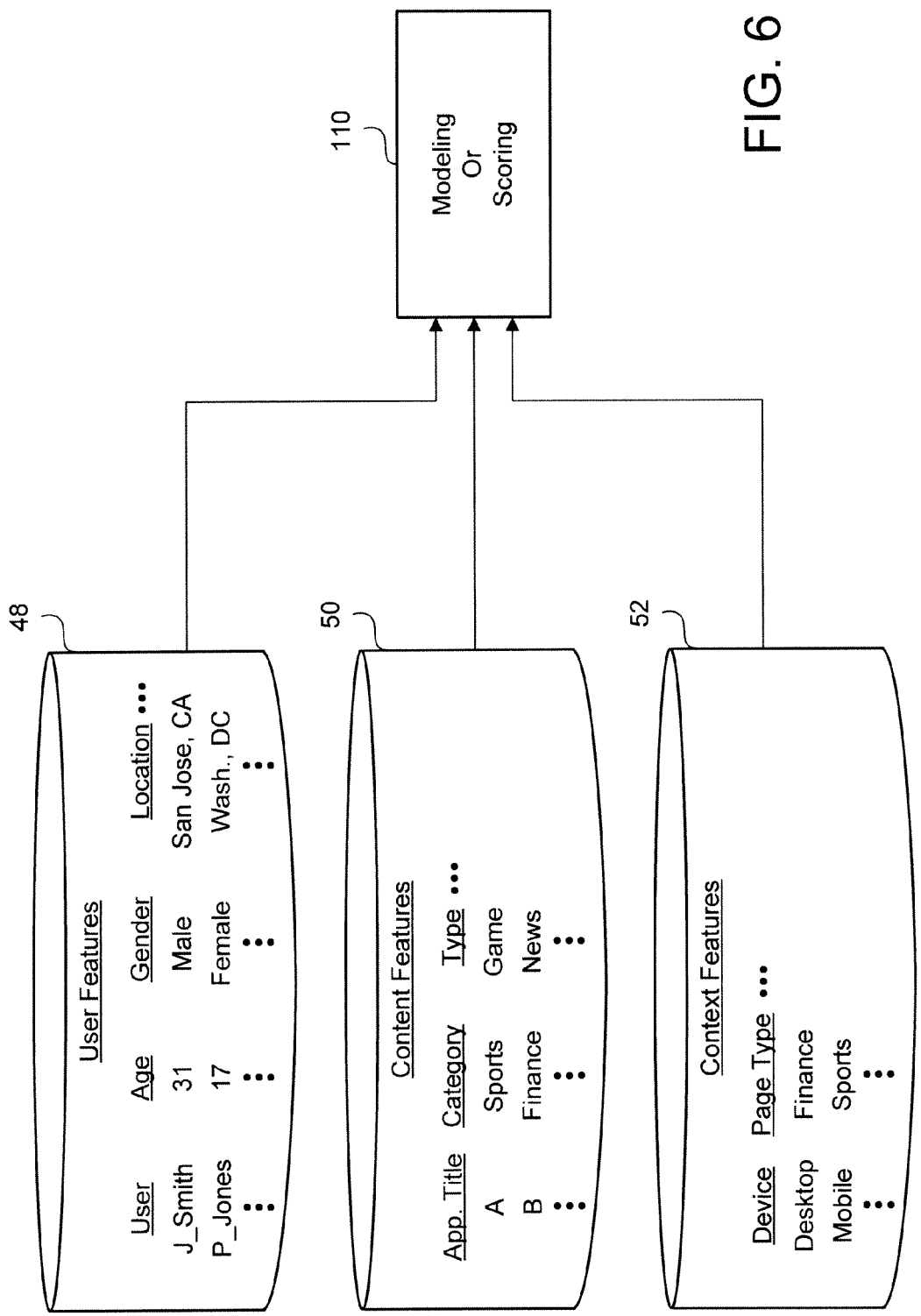
FIG. 6 illustrates detailed views of a user features storage, a content features storage, and a context features storage, in accordance with an embodiment of the invention.

With reference to FIG. 6, detailed views of the user features storage 48, the content features storage 50, and the context features storage 52 are shown. The user features stored in the user features storage 48 include various types of information related to the user, such as their age, gender, location, and other types of data which are useful for modeling, scoring and selection of content for display on a graphical display page, as described above. The content features stored in the content features storage 50 include various types of data related to the content which are useful for modeling, scoring and selection of content for display on the graphical display page. In accordance with an embodiment of the invention, wherein the content consists of application modules which may be displayed on the graphical display page, the content features describe attributes of the application modules, such as their category (e.g. sports, finance, weather, technology, etc.) and type (game, news application, utility, etc.). In various embodiments, the content features may include any other type of information related to the application modules which is useful for modeling, scoring and selection.

The context features stored in the context features storage 52 includes information related to the context in which the content displayed on the graphical display page appears. By way of example, the context features may include information such as the type of device on which the graphical display page is to be rendered, and the type of page (e.g. finance, sports, other categories, etc.) in which the content appears. In some embodiments, the context features may include session-related information, such as information relating to or descriptive of a previous page from which the user navigated to the present graphical display page, or information relating to other visited pages within the user's session history. Other examples of session-related information which could be utilized to provide context features may include the content of a prior search query, content previously entered in a form, prior menu selections, etc. The foregoing exemplary context features are provided by way of example only, and not by way of limitation, as in other embodiments, the context features may additionally include any other type of data relating to the context in which the content displayed on the graphical display page appears.

As shown at operation 110, the user features, content features, and context features are applied for purposes of modeling user interactions or scoring content, as described above.

Figure 7:
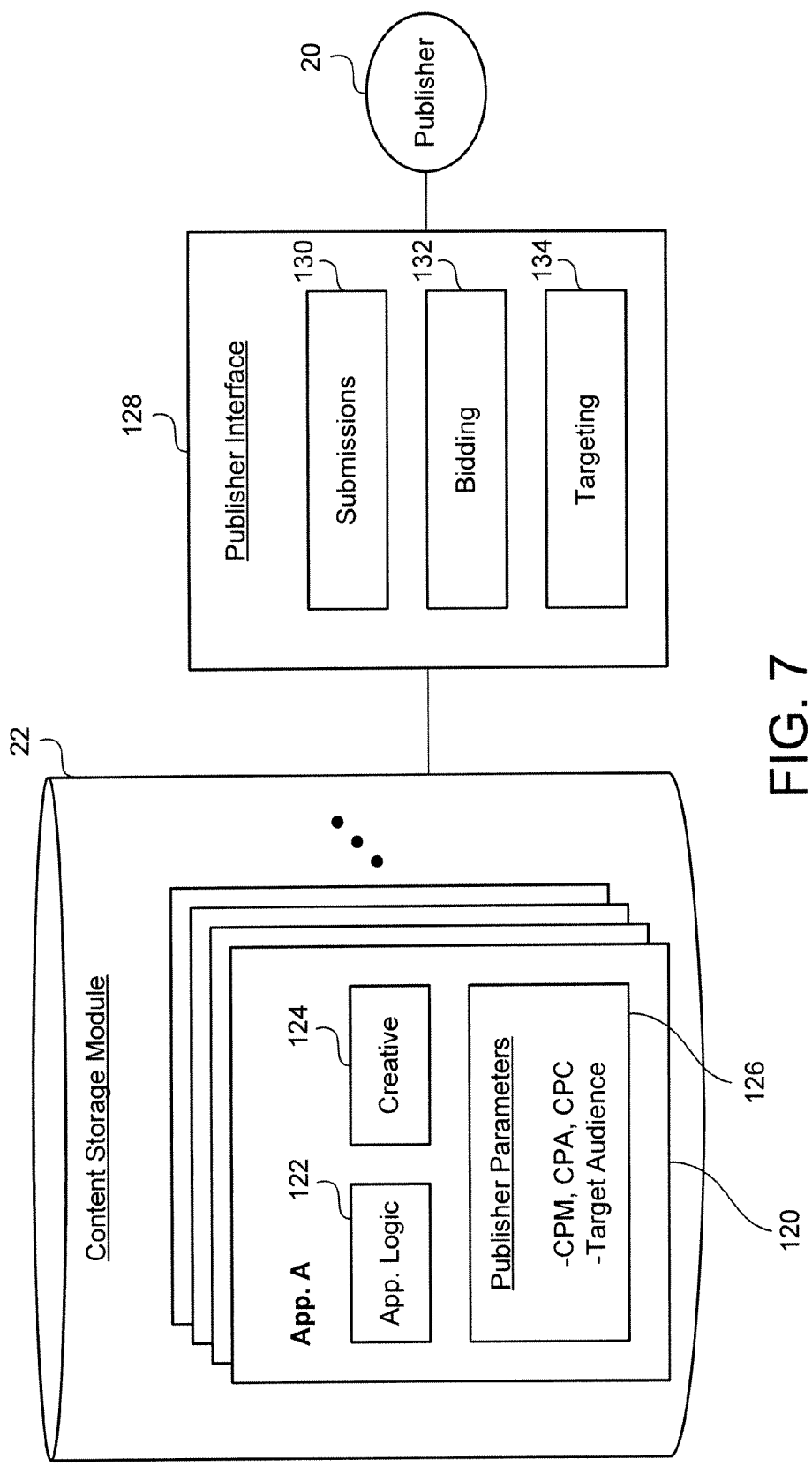
FIG. 7 illustrates detailed views of a content storage module and a publisher interface, in accordance with an embodiment of the invention.

With reference to FIG. 7, detailed views of a content storage module 22 and a publisher interface 128 are shown. Content modules such as the application modules 120 are stored in the content storage module 22. An exemplary application module 120 may include application logic 122, which constitutes the logical and functional portion of the application module which is executed when a user chooses to install or run the application. The application module 120 also includes an application creative portion 124, which may consist of icons, graphics, audio, video, summary information, and any other types of media or data which are representative of the application module 120. The media from the application creative portion 124 may be displayed or otherwise presented to a user on a graphical display page so as to inform the user of the application module 120. In one embodiment, the application creative portion 124 includes pop-up functionality, wherein additional information appears when an icon or graphic is hovered over by the user's pointing device, or when it is otherwise indicated that the user is viewing the icon or graphic. In other embodiments the application creative portion 124 may include any kind of data or functionality which informs the user about the application modules 120.

The application module 120 additionally includes publisher parameters 126. The publisher parameters may include costs that the publisher pays to the owner of the graphical display page when the user performs certain actions in relation to the publisher's application module 120. Examples include a cost-per-click (CPC), cost-per-impression (CPM), cost-per-action (CPA), cost-per-conversion, etc. In accordance with an embodiment of the invention, the cost may be a bidded value that the publisher submits. Because the value is bidded, the publisher 20 is able to view the bids of other publishers and bid accordingly so as to improve the publisher's chances of having their application module score higher according to the scoring method, and therefore be selected for display on the graphical display page.

The publisher parameters 126 may also include targeting parameters which enable the publisher 20 to specify a target demographic for the publisher's application module 120. Examples of targeting parameters include any of the aforementioned user features, such as gender, age, location, etc., as well as any of the aforementioned context features, such as device, page type, etc. By enabling the publisher 20 to target their application module 120 to a specific demographic, the publisher 20 may thus be able to ensure that their application module is only presented to those users that the publisher deems to be most beneficial to their interests. For example, the publisher 20 may determine that a specific demographic is most likely to purchase their application module, whereas a broader demographic is likely to click on their application creative but not necessarily purchase the application. The publisher 20 pays for both the clicks on the application creative and for the purchases of their application module, then the publisher 20 may deem it in their interest to focus on those users that are actually most likely to purchase their application module. Thus, the publisher 20 may specify targeting parameters so as to ensure that their application module is only presented to those users most likely to purchase their application module. The publisher may also combine targeting information with cost, so that he pays different amounts for different actions, depending on both the user and the action. The foregoing is provided by way of example only, as a publisher may specify targeting parameters for any particular reason which suits their interests.

With continued reference to FIG. 7, a publisher interface 128 is shown for enabling a publisher 20 to submit application modules and provide bids for specific actions related to their application modules. A submissions interface 130 is provided for enabling the publisher 20 to submit the application logic and application creative portion of their application module. A bidding interface 132 is provided for enabling the publisher to specify bids for specific actions related to their application module. A targeting interface 134 is provided for enabling the publisher 20 to specify a targeting parameters for a desired demographic to which the application module will be targeted.

Figure 8:
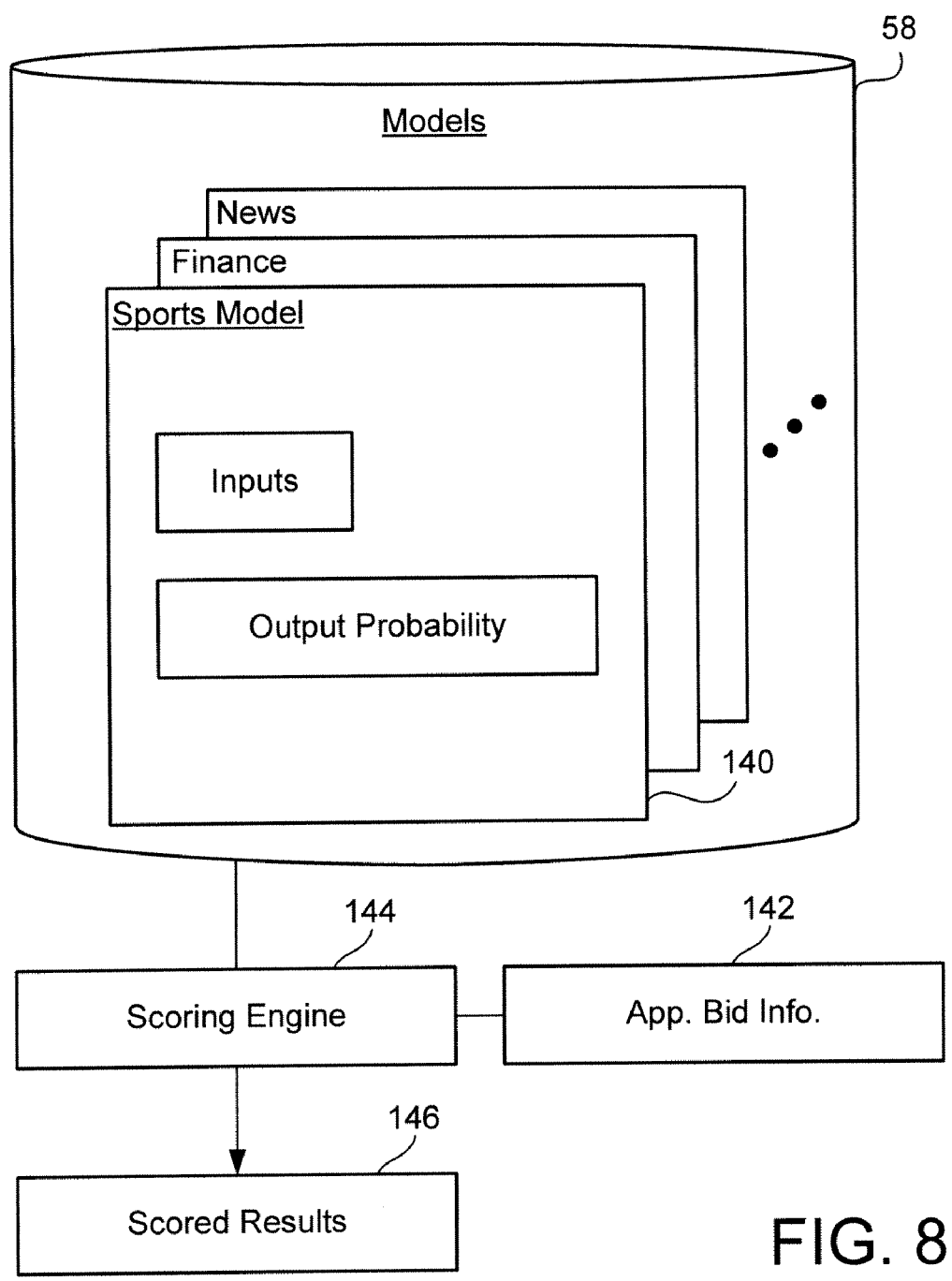
FIG. 8 illustrates components for scoring content, in accordance with an embodiment of the invention.

With reference to FIG. 8, a diagram illustrating components for scoring content is shown, in accordance with an embodiment of the invention. The model storage 58 contains models 140, which are utilized to determine the probability of a user taking a specific action. There may be different models for different kinds of parameters. In one embodiment, there are different models based on the type of content under consideration for display on a graphic display page. Examples of types of content include sports, finance, news, etc. and any other type of content which may be displayed on the graphical display page. In one embodiment, different models are created based on the type of action whose probability is to be predicted, such as a hover, click, selection, add, run, purchase, etc. In other embodiments, different models may be based on any type of criteria or parameters for which different models are useful in determining the probability of a user taking a particular action. The number of models stored in the model storage 58 may be one or more.

The exemplary model 140 is configured to accept certain inputs and output a probability that a user will take a particular action. A scoring engine 144 utilizes the appropriate model to determine the probability that a user will take a particular action in relation to particular content, such as an application module. The scoring engine also receives bid information 142 from the content storage 22 regarding the cost that the publisher will pay for the particular action. The scoring engine 144 utilizes both the probability of the user action and the bid information for the action to determine an overall score for an application module. The scored results 146 are produced by the scoring engine 144 based on the overall scores for each of the application modules under consideration.

Figure 9:
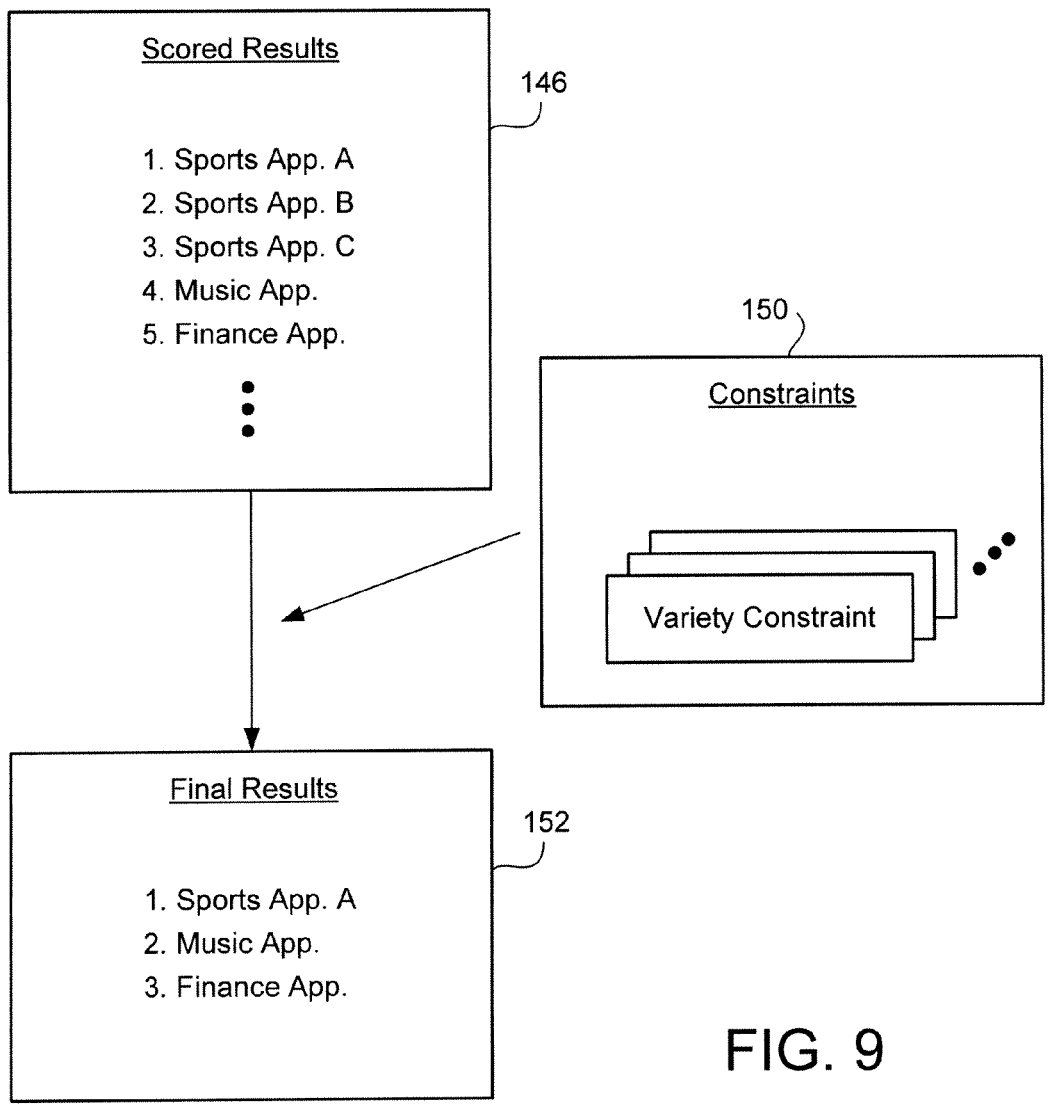
FIG. 9 illustrates process for applying constraints to scored results for content, in accordance with an embodiment of the invention.

With reference to FIG. 9, a process for applying constraints to scored results for content is shown. The scored results 146 as shown include three sports applications as the top three results, followed by a music application and a finance application. Constraints 150 are applied to the scored results 146, so as to yield the final results 152. Constraints 150 include any of various constraints which may be applied to the scored results, such as constraints to ensure variety, enable specific content to be featured, override the scored results, etc.

In the example shown at FIG. 9, a variety constraint is applied so as to prevent two of the same kind of application modules in the final results. Thus, though three sports applications ranked highest according to the scored results, because of the variety constraint applied, the final results include only one of them, with the rest of the final results being other applications which initially ranked lower according to the scored results than those which were ignored because of the variety constraint. Thus, as shown in FIG. 9, the final results 152 include a sports application, and the music application and finance application. These applications are thus selected for display on the graphical display page. The foregoing example of an application of constraints to scored results to yield the final results is provided by way of example only, and not by way of limitation. It will be understood by those skilled in the art that in other embodiments, any set of constraints may be applied to any set of scored content in order to select the highest scoring content which satisfies the set of constraints.

Figure 10:
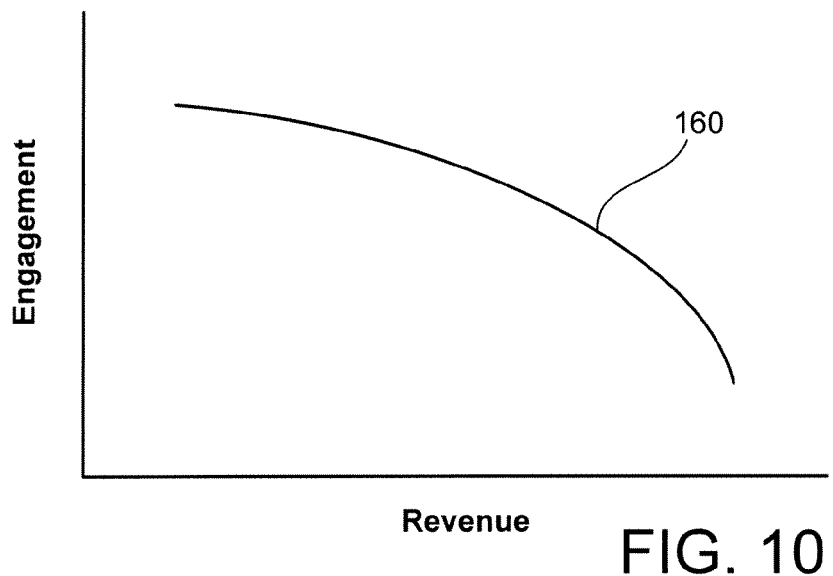
FIG. 10 illustrates a graph showing engagement vs. revenue, in accordance with an embodiment of the invention.

With reference to FIG. 10, a graph illustrating engagement vs. revenue is shown. Engagement is a measure of the ability of the graphical display page to "engage" or interest users. Thus, the level of engagement depends upon the attractiveness of the content on the graphical display page to the users. Revenue is a measure of the commercial value that the owner of the graphical display page receives as a result of users interacting with the graphical display page. The revenue is generally paid to the owner by publishers of content that is displayed on the graphical display page. The curve 160 illustrates a trade-off between engagement and revenue. As shown, when content displayed on the graphical display page is optimized for a high level of engagement, the revenue produced by displaying such content is reduced. Whereas, when the content displayed is optimized for a high level of revenue, then the level of engagement tends to be low. This situation may occur when the highest revenue-producing content is not likely to be interesting to many users, but nonetheless generates high revenue because the publishers are willing to pay a high cost for the user interactions that do occur despite the relatively low engagement.

Figure 11:
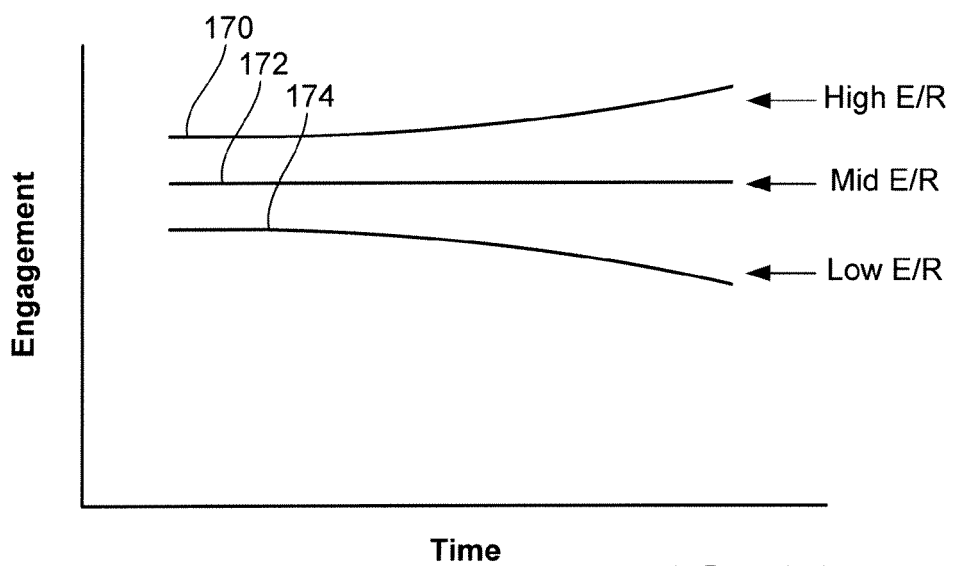
FIG. 11 illustrates a graph of engagement vs. time, in accordance with an embodiment of the invention.

Additionally, the relationship between engagement and revenue may change over time, as illustrated at FIG. 11, which shows a graph of engagement vs. time. Curve 170 illustrates the case where content is optimized for high engagement (high engagement vs. revenue (E/R)). As shown, over time, engagement will increase as users are drawn to the graphical display page because of its content. Curve 172 illustrates the case of a balance between engagement and revenue (mid E/R). As shown, the level engagement may remain relatively steady over time. And curve 174 illustrates the case where content is optimized for high revenue (low E/R). For such a case, the engagement decreases over time, as some users become less likely to return to view the graphical display page because the content is not engaging or interesting to them.

By knowing the relationships between engagement, revenue, and time, the owner of the graphical display page may set the optimization criteria for content displayed on the graphical display page according to their priorities. The foregoing examples of engagement vs. revenue, as well as the time-dependent effects of various optimizations are provided by way of example only, and not be way of limitation. It will be understood by those skilled in the art that various other scenarios are contemplated in which the relationship between engagement, revenue, and time may differ, without departing from the scope of the present invention.

Figure 12:
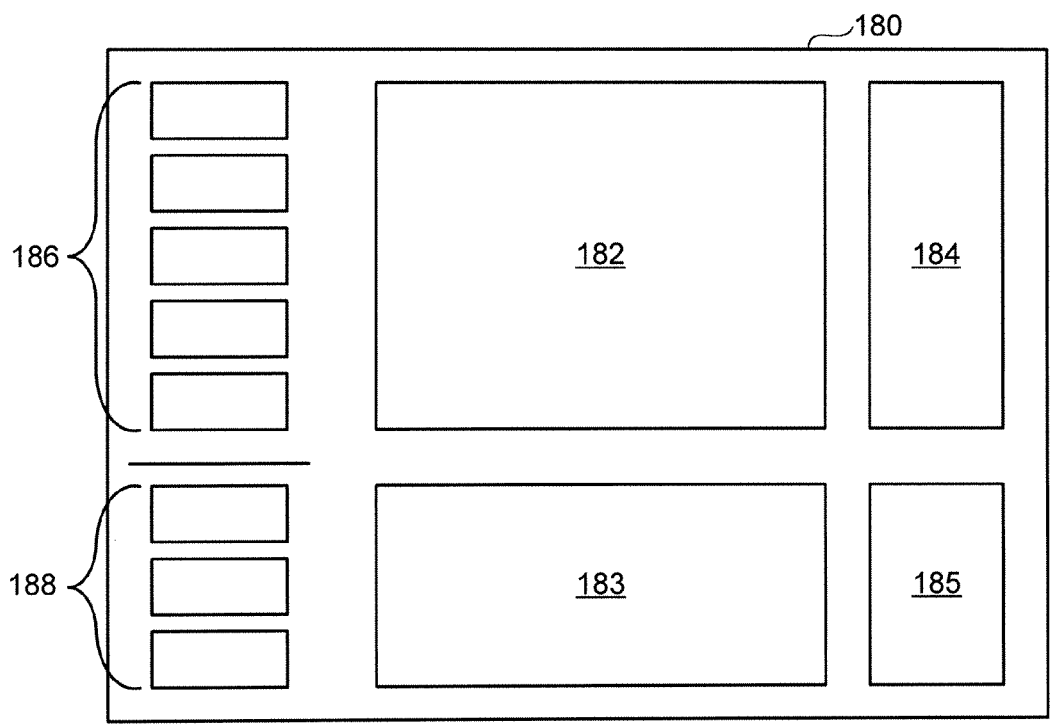
FIG. 12 illustrates an exemplary layout template for a graphical display page, in accordance with an embodiment of the invention.

With reference to FIG. 12, an exemplary layout template 180 for a graphical display page is shown, in accordance with an embodiment of the invention. In one embodiment, the elements 182, 183, 184, and 185 display non-application content, such as articles, photos, videos, advertisements, etc. For example, elements 182 and 183 might be utilized to display articles or photos, whereas elements 184 and 185 are utilized to display advertisements, thereby featuring the articles or photos more prominently in the center of the graphical display page. In one embodiment, elements 186 are utilized to display existing application modules which are either automatically included as part of the graphical display page, or may have been added as a customization option to the specific settings for the particular user of the page. Whereas elements 188 are utilized to display application modules which are being recommended to the user.

Figure 13:
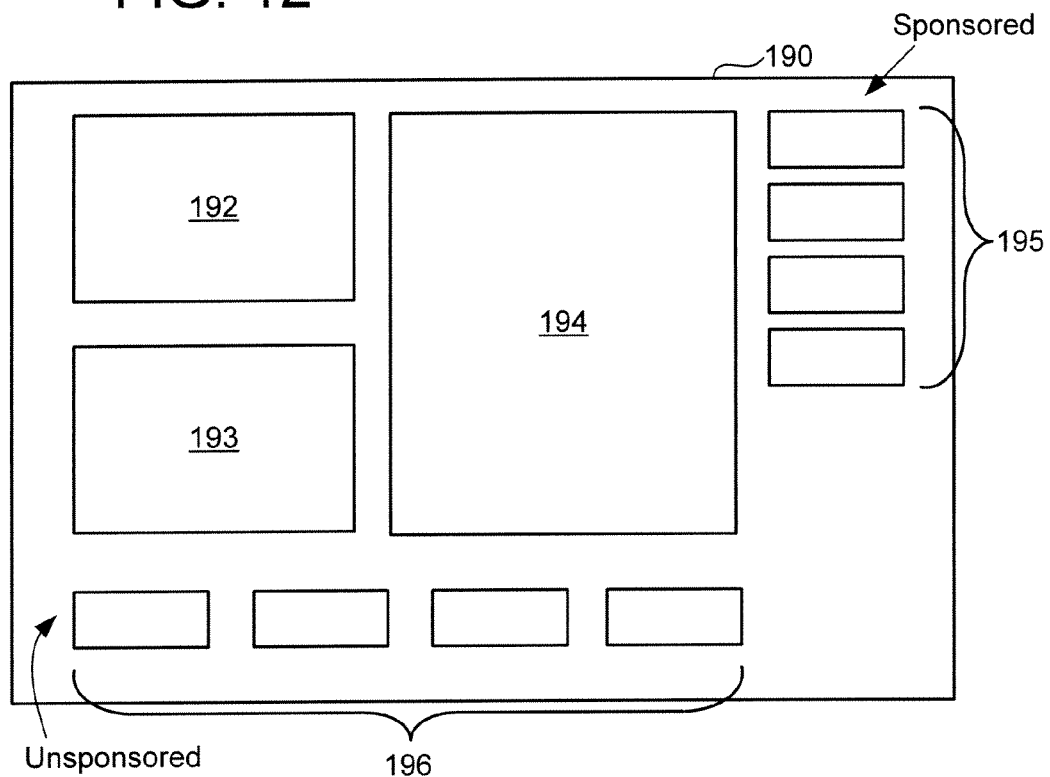
FIG. 13 illustrates an exemplary layout template for a graphical display page, in accordance with an embodiment of the invention.

With reference to FIG. 13, an exemplary layout template 190 for a graphical display page is shown, in accordance with an embodiment of the invention. In one embodiment, the elements 192, 193, and 194 are configured to display non-application content, such as articles, photos, videos, advertisements, etc. Elements 195 and 196 are utilized to display application modules. In one embodiment, the elements 195 and elements 196 are configured to display application modules which have been chosen on the basis of different optimization criteria. For example, in one embodiment, elements 195 may be configured for displaying sponsored or revenue generating application modules, whereas elements 196 may be configured for displaying unsponsored or non-revenue generating application modules. In other embodiments, the elements displayed at the elements 195 and 196 may be optimized in any two different manners, in accordance with the scoring and selection methods described above.

Figure 14:
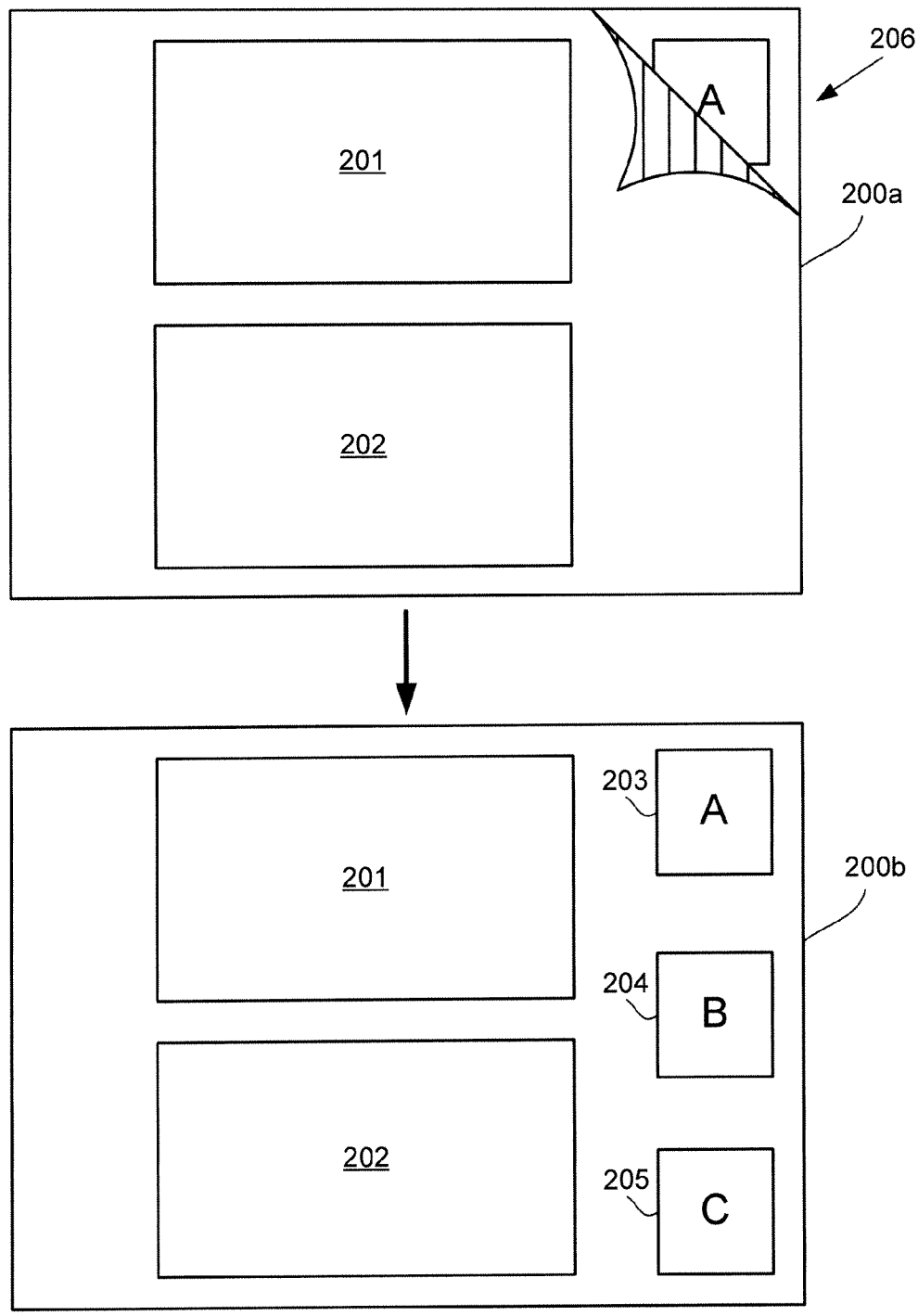
FIG. 14 illustrates an exemplary layout template for a graphical display page, in accordance with an embodiment of the invention.

With reference to FIG. 14, an exemplary layout template 200a for a graphical display page is shown, in accordance with an embodiment of the invention. In one embodiment, the elements 201 and 202 are configured to display non-application content, such as articles, photos, videos, advertisements, etc. The layout template 200a additionally includes a selectable region 206 for revealing application modules. When the region is clicked on or otherwise selected, then application modules are revealed as shown by the layout template 200b. In particular, the elements 203, 204, and 205 are configured for displaying application modules. Thus, in this embodiment, the application modules are hidden until the user opts to reveal them through selection of the selectable region 206.

Figure 15:
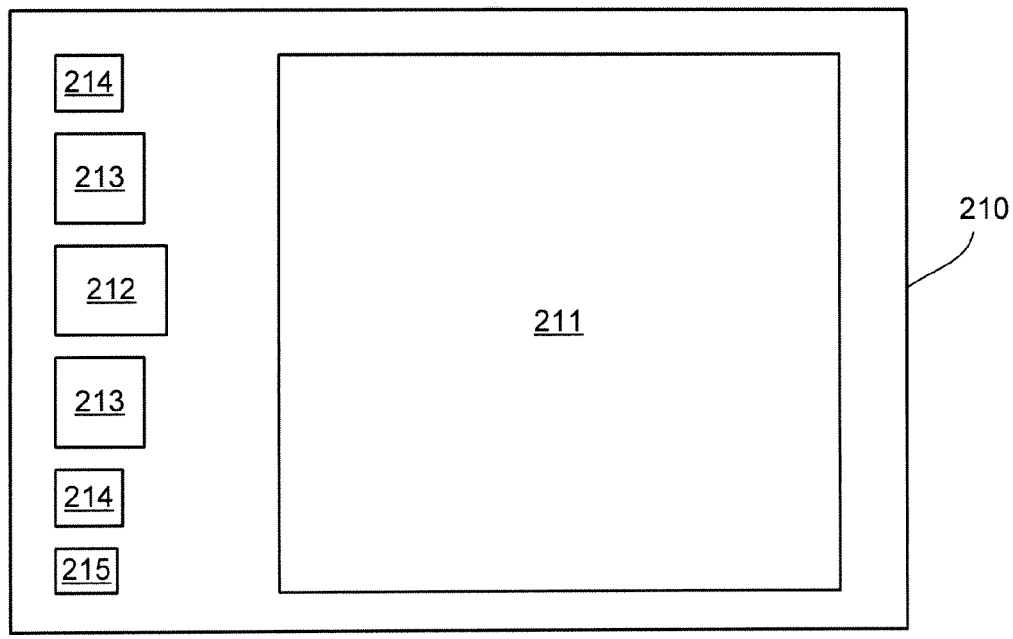
FIG. 15 illustrates an exemplary layout template for a graphical display page, in accordance with an embodiment of the invention.

With reference to FIG. 15, an exemplary layout template 210 for a graphical display page is shown, in accordance with an embodiment of the invention. In one embodiment, the element 211 is configured to display non-application content, such as articles, photos, videos, advertisements, etc. Elements 212, 213, 214, and 215 are configured to display application modules. In one embodiment, these elements are configured so as to be different sizes so as to selectively highlight application modules. For example, the element 212 may be the largest element for displaying an application module. Whereas elements 213 may be smaller, elements 214 smaller still, and element 215 smallest. By arranging application modules in various sizes, different application modules may be highlighted or featured more prominently to the user. For example, in one embodiment, the most optimal application module, as determined in accordance with the scoring and selection methods described above, is displayed at element 212 (largest). Whereas, other optimal application modules are displayed at elements 213, 214, and 215 in descending order of optimization, respectively.

Figure 16:
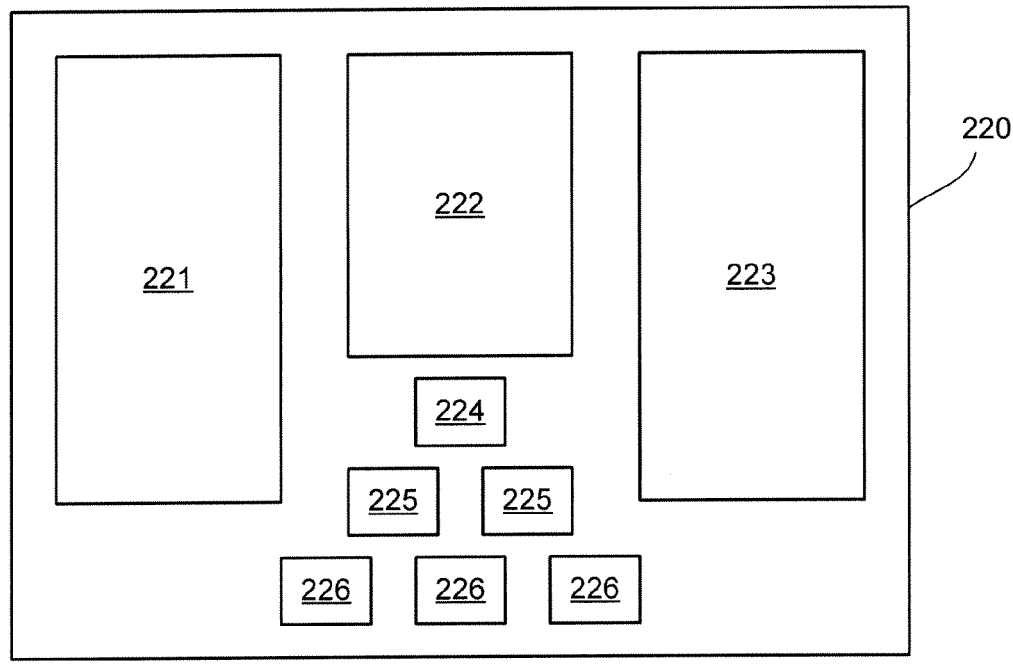
FIG. 16 illustrates an exemplary layout template for a graphical display page, in accordance with an embodiment of the invention.

With reference to FIG. 16, an exemplary layout template 220 for a graphical display page is shown, in accordance with an embodiment of the invention. In one embodiment, the elements 221, 222, and 223 are configured to display non-application content, such as articles, photos, videos, advertisements, etc. Elements 224, 225, and 226 are configured to display application modules. The elements 224, 225, and 226 are arranged in a pyramidal structure, with element 224 located at the top, and elements 225 at a lower level, and elements 226 at the lowest level. Thus, by way of example, element 224 may be utilized to display the most optimal application module, as determined according to the scoring and selection methods described above. Whereas, elements 225 and 226 may be utilized to display the next most optimal application modules in descending order respectively.

Figure 17:
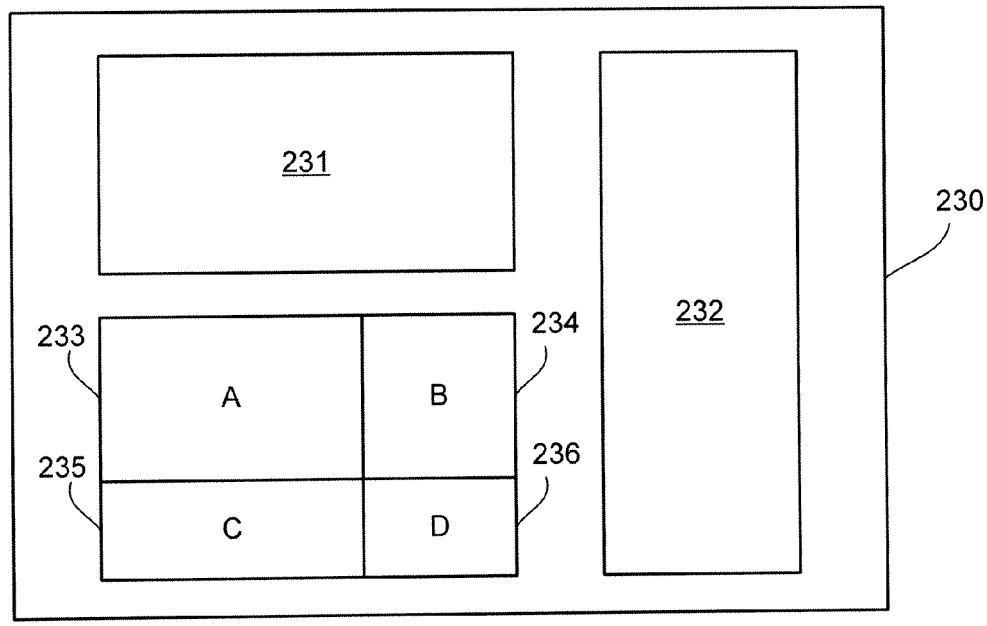
FIG. 17 illustrates an exemplary layout template for a graphical display page, in accordance with an embodiment of the invention.

With reference to FIG. 17, an exemplary layout template 230 for a graphical display page is shown, in accordance with an embodiment of the invention. In one embodiment, the elements 231 and 232 are configured to display non-application content, such as articles, photos, videos, advertisements, etc. Elements 233, 234, 235, and 236 are configured to display application modules. As illustrated, these elements are arranged immediately adjacent to each other in a cluster, with element 233 being the largest, followed by elements 234, 235 and 236. In one embodiment, element 233 is configured to display the most optimal application module, as determined according to the scoring and selection methods described above. Whereas elements 235 and 236 are configured to display the next most optimal application modules.

Figure 18:
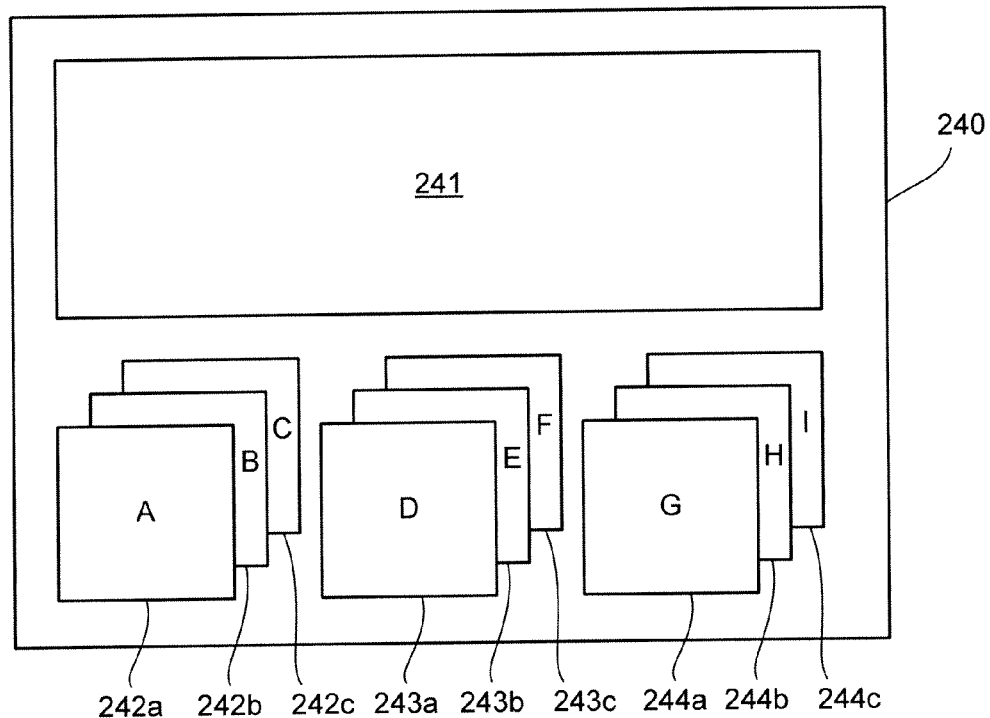
FIG. 18 illustrates an exemplary layout template for a graphical display page, in accordance with an embodiment of the invention.

With reference to FIG. 18, an exemplary layout template 240 for a graphical display page is shown, in accordance with an embodiment of the invention. In one embodiment, the element 241 is configured to display non-application content, such as articles, photos, videos, advertisements, etc. Elements 242a, 242b, 242c, 243a, 243b, 243c, 244a, 244b, and 244c are configured to display application modules. As shown, elements 242a, 242b, and 242c are grouped together and arranged in a layered or stacked formation. Elements 243a, 243b, and 243c, as well as elements 244a, 244b, and 244c are similarly grouped and arranged. In one embodiment each group of elements may be configured to display different sets of application modules which have been selected on the basis of different optimization criteria. In this manner, the different groups of elements may be utilized to present the user with a variety of application modules.

While embodiments of the invention have generally been described with reference to the presentation of application modules on a graphical display page, which is an example of a visually based interface, it is recognized that the principles herein described may also apply to other types of visually-based interfaces. Moreover, the principles of the present invention may also be applied to other modes of presenting application modules to a user. For example, in other embodiments of the invention, the foregoing application modules may be presented via an audio-based interface.

In one specific embodiment, a user may be presented with audio content that is selectable by the user. In various embodiments, the method of selection may encompass various interfaces such as a voice-recognition interface, key/button type interface, touch interface, etc. For example, a user might interact with audio content over a telephone, and utilize either or both of a voice-recognition type interface and/or the buttons of the telephone to provide input regarding selection of audio content. Then, in accordance with principles described above regarding modeling user interactions, content scoring, and selection of content based on constraints, one or more application modules may be presented to the user in an audio-based manner.

In still other embodiments of the invention, various types of interfaces for the presentation of content and application modules might be combined. For example, a user might interact with a visually-based interface for the selection and viewing of content; however, the application modules might be presented in an audio-based manner. Or in an opposite manner, a user might interact with an audio-based interface for the selection of content; whereas, the application modules might be presented in a visually-based manner. In various other embodiments of the invention, any of multiple types of interfaces may be combined for the presentation of application modules to users in accordance with the principles described herein.

Embodiments of the invention as herein described may utilize relational database systems as are known in the art. Examples of such database systems include MySQL, Oracle, and Access. Various operations as described above may be effected by performance of an operation via a relational database management system. Such database systems may be embodied in one or more server computers, which may be configured as part of a network of computers.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overall operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for presenting recommended application modules from a plurality of application modules, the method comprising:
    determining content to be displayed on a graphical display page;
    for each application in the plurality of application modules, determining the probability that a specific user will select the application module;
    for each application module in the plurality of application modules, determining an overall score based on the determined probability that the user will select the application module and a commercial value assigned by a publisher of the application module when it is presented or selected;
    determining recommended application modules to be those application modules in the plurality of application modules which have the highest overall score;
    presenting the recommended application modules to the user.

2. The method of claim 1, wherein the recommended application modules are presented on the graphical display page.

3. The method of claim 2, wherein the recommended application modules are presented in a priority orientation, the priority orientation based on the overall scores of the recommended application modules.

4. The method of claim 1, further comprising,
    determining content features, the content features including data which describes the content that is to be displayed on the graphical display page; and
    wherein the determined probability that a specific user will select the application module is based at least in part on the content features.

5. The method of claim 1, further comprising,
    determining user features, the user features including data which describes characteristics of the user; and
    wherein the determined probability that a specific user will select the application module is based at least in part on the user features.

6. The method of claim 5, wherein the user features are selected from the group consisting of age, gender, and location.

7. The method of claim 1, wherein selection of an application module includes one or more of the following actions: clicking on the application module, hovering on the application module, clicking or hovering within the application module, subscribing to the application module, purchasing the application module, purchasing content offered within the application module, adding the application module to a group of personal application modules.

8. The method of claim 1, wherein the recommended application modules are determined to be those application modules in the plurality of application modules which have the highest overall score and which satisfy a set of constraints.

9. The method of claim 8, wherein the set of constraints includes one or more of a variety constraint, the variety constraint requiring that the recommended application modules include more than one type of applet, and a placement constraint, the placement constraint requiring that a specific application module be included within the recommended application modules.

10. The method of claim 1, wherein the content is selected from the group consisting of news, articles, pictures, advertisements, text, photos, graphics, audio, video, stories, games, shopping, advertisements, weather, sports, entertainment, business/finance, calendar, personal planner, email, real estate, music, maps, personals, travel, groups, instant messaging, tracking, monitoring, utilities, and editors.

11. The method of claim 1, wherein each of the presented application modules includes a link to additional information related to the application module, the additional information including one or more of the following: a description of the application module, access to a mechanism for facilitating purchase of the application module or content offered within the application module, access to a mechanism for facilitating addition of the application module to a group of personal application modules.

12. A method for presenting application modules from a plurality of application modules on a graphical display page, the method comprising:
    obtaining a plurality of application modules from publishers, the publishers defining content for the application modules, the publishers assigning a commercial value to each of the application modules, the commercial value representing a cost to the publisher when the application module is presented to or selected by a user;
    identifying a selected user that interfaces with a graphical display page that is to present one or more of the obtained application modules;
    obtaining a probability value for the selected user for each one of the plurality of application modules, the probability value defining which ones of the plurality of application modules is most likely to be used by the selected user;
    combining the probability value with the commercial value assigned by the publisher; and
    presenting a set of application modules on the graphical display page in a priority orientation, such that the priority orientation defines an optimal placement based on the commercial value and the probability value.

13. The method of claim 12, wherein identifying the selected user includes identifying a user profile for the selected user, the user profile for the selected user includes data which describes characteristics of the selected user; and
    wherein the probability value for each one of the plurality of application modules is determined based on the user profile.

14. The method of claim 13, wherein the characteristics of the selected user are selected from the group including age, gender, location, topics of interest, and sources of interest.

15. The method of claim 13, wherein the characteristics of the user include content preferences of the selected user when interacting with the graphical display page.

16. The method of claim 15, wherein the content preferences of the selected user are determined by tracking the interactions of the selected user with the graphical display page.

17. The method of claim 12, wherein the probability value for each one of the plurality of application modules is determined based on a user profile of the selected user and characteristics of the one of the plurality of application modules.

18. A method for presenting application modules, the method comprising:
    obtaining a monetization value for an application module from a publisher of the application module;
    categorizing the application module according to characteristics of the application module;
    modeling scenarios to identify a probability for specific users, the scenarios including presentation of the application module on a graphical display page, the probability indicating a likelihood that a specific user will select the application module; and
    presenting the application module on the graphical display page in a priority orientation based on the probability and monetization value for the application module.

19. The method of claim 18, wherein the probability is determined based on characteristics of the specific user, characteristics of content displayed on the graphical display page, and the characteristics of the application module.

20. The method of claim 19, wherein the characteristics of the specific user include characteristics selected from the group consisting of age, gender, location, topics of interest, and sources of interest.

21. The method of claim 18, wherein the monetization value is defined by a monetary value expressed by the publisher and associated with selection of the application module by a user.

22. The method of claim 18, further comprising,
    receiving an application icon associated with the application module; and
    wherein the presentation of the application module includes display of the application icon on the graphical display page.

23. The method of claim 22, wherein the selection of the application module includes one or more of the following: clicking on the application icon, hovering on the application icon, purchasing the application module, purchasing content displayed within the application module, adding the application module to a group of personal application modules.

* * * * *